United States Patent
Darty

(10) Patent No.: US 10,921,186 B2
(45) Date of Patent: Feb. 16, 2021

(54) METHODS AND APPARATUS FOR IMAGING DISCRETE WAVELENGTH BANDS USING A MOBILE DEVICE

(71) Applicant: Hypermed Imaging, Inc., Memphis, TN (US)

(72) Inventor: Mark Anthony Darty, Collierville, TN (US)

(73) Assignee: HYPERMED IMAGING, INC., Memphis, TN (US)

(*) Notice: Subject to any disclaimer, the term of this patent is extended or adjusted under 35 U.S.C. 154(b) by 510 days.

(21) Appl. No.: 15/761,778

(22) PCT Filed: Sep. 22, 2016

(86) PCT No.: PCT/US2016/053172
§ 371 (c)(1),
(2) Date: Mar. 20, 2018

(87) PCT Pub. No.: WO2017/053609
PCT Pub. Date: Mar. 30, 2017

(65) Prior Publication Data
US 2020/0240840 A1     Jul. 30, 2020

Related U.S. Application Data

(60) Provisional application No. 62/222,006, filed on Sep. 22, 2015.

(51) Int. Cl.
*G01J 3/28* (2006.01)
*G01J 3/02* (2006.01)
*G01J 3/51* (2006.01)

(52) U.S. Cl.
CPC .......... *G01J 3/0272* (2013.01); *G01J 3/0264* (2013.01); *G01J 3/2823* (2013.01); *G01J 3/51* (2013.01); *G01J 2003/2826* (2013.01)

(58) Field of Classification Search
CPC .... G01J 3/02; G01J 3/28; G01J 3/2803; G01J 3/10; G01J 3/2823
(Continued)

(56) References Cited

U.S. PATENT DOCUMENTS

2011/0292198 A1* 12/2011 Lapstun ............. H04N 1/00129
348/79
2015/0177429 A1* 6/2015 Darty ................... H04N 5/2256
348/342

FOREIGN PATENT DOCUMENTS

WO     WO-2014007869 A2 *  1/2014  ............. G01N 21/31

* cited by examiner

Primary Examiner — Md M Rahman
(74) Attorney, Agent, or Firm — Brett A. Lovejoy; Andrew J. Antczak; Morgan, Lewis & Bockius LLP

(57) ABSTRACT

An attachment device comprising a cover, with first and second windows, is affixed to a backing, with third and fourth windows, thereby forming a casing. The first and third windows form a first optical path with light entering the third window passing through the first window. The second and fourth windows form a second optical path with light entering the second window passing through the fourth window. A filter housing with a plurality of filters is driven by a motor so that the filters intercept the first optical path in accordance with an imaging regimen electronically stored in the casing interior. The imaging regimen communicates instructions, via a communications interface of the attachment device, to an imager and light source of an external device, to which the attachment device is attached, thereby controlling these components in accordance with the regimen.

20 Claims, 14 Drawing Sheets

(58) Field of Classification Search
USPC .......................................................... 356/326
See application file for complete search history.

METHODS AND APPARATUS FOR IMAGING DISCRETE WAVELENGTH BANDS USING A MOBILE DEVICE

CROSS REFERENCE TO RELATED APPLICATION

This application claims priority to U.S. Provisional Patent Application No. 62/222,006, filed Sep. 22, 2015, the disclosure of which is hereby incorporated by reference herein in its entirety for all purposes.

FIELD OF THE APPLICATION

This application generally relates to systems and methods for hyperspectral/multispectral imaging.

BACKGROUND

Hyperspectral/multispectral spectroscopy is an imaging technique that integrates multiples images of an object resolved at different narrow spectral bands (e.g., narrow ranges of wavelengths) into a single data cube, referred to as a hyperspectral/multispectral data cube. Data provided by hyperspectral/multispectral spectroscopy allow for the identification of individual components of a complex composition through the recognition of hyperspectral/multi spectral signatures for individual components within the hyperspectral/multispectral data cube.

Hyperspectral/multispectral spectroscopy has been used for a variety of applications, ranging from geological and agricultural surveying to military surveillance and industrial evaluation. For example, satellite hyperspectral/multispectral imaging has been used in mineral exploration, environmental monitoring and military surveillance. (See, Bowles J. H. et al., Imaging Spectrometry III; 1997: Proc SPIE 1997. p. 38-45; Riaza A. et al., Inteml J Applied Earth Observation and Geoinformation Special issue: Applications of imaging spectroscopy 2001; 3-4:345-354; Thenkabail P. S. et al., Remote Sens Environ 2000; 71 (REMOTE SENS ENVIRON):158-182; and Tran C. D., Fresenius J Anal Chem 2001; 369(3-4):313-9, the contents of which are hereby incorporated herein by reference in their entireties for all purposes.)

Hyperspectral/multispectral spectroscopy has also been used in medical applications to assist with complex diagnosis and predict treatment outcomes. For example, medical hyperspectral/multispectral imaging has been used to accurately predict viability and survival of tissue deprived of adequate perfusion, and to differentiate diseased (e.g. tumor) and ischemic tissue from normal tissue. (See, Colarusso P. et al., Appl Spectrosc 1998; 52:106A-120A; Greenman R. I. et al., Lancet 2005; 366:1711-1718; and Zuzak K. J. et al., Circulation 2001; 104(24):2905-10; the contents of which are hereby incorporated herein by reference in their entireties for all purposes.)

Despite the great potential hyperspectral/multispectral spectroscopy holds for medical imaging, several drawbacks have limited its use in the clinic setting (Kester R. T. et al., J. Biomed. Opt. 16, 056005 (May 10, 2011)). For example, medical hyperspectral/multispectral instruments are costly, typically tens to hundreds of thousands of dollars, due to the complex optics required to resolve images at a plurality of narrow spectral bands. The cost and inconvenience of using hyperspectral/multispectral imaging for routine screening and/or monitoring of medical conditions is further increased by the requirement that subjects visit a clinical environment with a hyperspectral/multispectral imaging device. This incurs administrative costs, medical professional service costs, and further clogs the clinical environment.

Thus, there is an unmet need in the field for less expensive and more rapid means of hyperspectral/multispectral imaging. The present disclosure meets these and other needs by providing devices, methods, and systems for performing hyperspectral/multispectral imaging with external devices.

SUMMARY

The present disclosure addresses the above-identified shortcomings by providing an attachment device that attaches to an external device. The external device can be, for example, a smart phone, a personal digital assistant (PDA), an enterprise digital assistant, a tablet computer, or a digital camera. In a typical embodiments, the attachment device attaches (e.g., clips or screws on) to the external device. In one embodiment, the external device is a smart phone and the attachment device clips onto the smart phone. The attachment device is a self-contained casing in its own right. In one embodiment the self-contained casing of the attachment device comprises a cover that is affixed to a backing. The cover has first and second windows while the backing has matching third and fourth windows in the sense that the first and third windows form a first optical path with light entering the third window passing through the first window while the second and fourth windows form a second optical path with light entering the second window passing through the fourth window. Inside the casing of the attachment device there is a moveable filter housing. The moveable filter housing has a plurality of filters and movement of the filter housing is driven by a motor. In this way, the filters of the filter housing selectively intercept the first optical path in accordance with an imaging regimen electronically stored in the casing interior. The imaging regimen communicates instructions, via a communications interface of the attachment device, to an imager and light source of an external device, to which the attachment device is attached, thereby controlling these components in accordance with the regimen.

Now that an overview of the present disclosure has been provided, specific detailed embodiments are provided.

Attachment Embodiments. One such embodiment provides an attachment device comprising a cover, having a first optical window and a second optical window, and a backing, having a third optical window and a fourth optical window. The cover is affixed onto the backing thereby forming a casing having an interior. The first and third optical window form a first optical path within the casing interior, in which light entering the third optical window passes through the first optical window. The second and fourth optical window form a second optical path within the casing interior, in which light entering the second optical window passes through the fourth optical window. A filter housing, in the interior of the casing, comprises a plurality of filters. Each filter in the plurality of filters characterized by a wavelength range in a plurality of wavelength ranges. The filter housing is moveable along or about an axis to thereby selectively intercept the first optical path. A first filter in the plurality of filters is characterized by a first wavelength range in the plurality of wavelength ranges. The first filter is transparent to the first wavelength range and opaque to other wavelengths in at least the visible spectrum. A second filter in the plurality of filters is characterized by a second wavelength range in the plurality of wavelength ranges, where the second filter is transparent to the second wavelength range and opaque to other wavelengths in at least the visible spectrum. The first wavelength range is other than the second wavelength range. In some embodiments, the first wavelength range overlaps the second wavelength range. In some embodiments, the first wavelength range does not overlap the second wavelength range. A motor, in the interior of the casing, is configured to move the filter housing. A circuit board, also in the interior of the casing, comprises non-transitory instructions for implementing at least a portion of a hyperspectral/multispectral imaging regimen. The instructions for implementing the hyperspectral/multispectral imaging regimen include instructions for driving the motor in accordance with the hyperspectral/multispectral imaging regimen. The attachment device further includes a communications interface, configured to send instructions to an external device. The external device comprises a two-dimensional imager and a light source. The instructions sent by the attachment device control the two-dimensional imager and the light source in accordance with the hyperspectral/multispectral imaging regimen. The attachment device is attached to the external device. The attachment device further includes a source of power, in the interior of the casing, to power the circuit board, the motor, and the communications interface.

In some embodiments, the second optical window or the fourth optical window comprises a first light source polarizer that polarizes light in the second optical path. In some embodiments, the second optical window or the fourth optical window comprises a first homogenizer that homogenizes light in the second optical path.

In some embodiments, the two-dimensional imager of the external device is a charge-coupled device (CCD), a complementary metal-oxide-semiconductor (CMOS), a photo-cell, or a focal plane array.

In some embodiments, the plurality of filters comprises at least one bandpass filter. In some embodiments, the plurality of filters comprises at least one longpass filter or at least one shortpass filter.

In some embodiments, the hyperspectral/multispectral imaging regimen comprises instructions for driving the filter housing to a first position in which the first filter selectively intercepts the first optical path. The hyperspectral/multispectral imaging regimen further comprises instructions for communicating instructions, via the communications interface, to the light source to power on. The hyperspectral/multispectral imaging regimen further comprises instructions for communicating instructions, via the communications interface, to the two-dimensional imager to acquire a first image of light passing through the first optical path when the filter housing is in the first position. The hyperspectral/multispectral imaging regimen further comprises instructions for driving, after the first image is acquired, the filter housing to a second position in which the second filter selectively intercepts the first optical path and the first filter no longer intercepts the first optical path. The hyperspectral/multispectral imaging regimen further comprises instructions for communicating instructions, via the communications interface, to the two-dimensional imager, to acquire a second image of light passing through the first optical path when the filter housing is in the second position.

In some embodiments, the communication interface comprises a wireless signal transmission element and instructions are sent in accordance with the hyperspectral/multispectral imaging regimen to the external light source by the wireless signal transmission element. In some embodiments, the wireless signal transmission element is selected from the group consisting of a Bluetooth transmission element, a ZigBee transmission element, and a Wi-Fi transmission element.

In some embodiments, the communication interface comprises a first communications interface and instructions are sent in accordance with the hyperspectral/multispectral imaging regimen to the external light by a cable coupled to the first communications interface source and a second communications interface of the external device.

In some embodiments, the communications interface comprises a first communications interface and the housing attaches to the external device thereby bringing the first communications interface in direct physical and electrical communication with a second communications interface of the external device thereby enabling instructions to be sent directly to the second communications interface from the first communications interface in accordance with the hyperspectral/multispectral imaging regimen.

In some embodiments, the external device is selected from the group consisting of a smart phone, a personal digital assistant (PDA), an enterprise digital assistant, a tablet computer, and a digital camera.

In some embodiments, the external device further comprises a display, and the hyperspectral/multispectral imaging regimen further comprises instructions for displaying an image captured by the two-dimensional imager, in accordance with the hyperspectral/multispectral imaging regimen, on the housing display. In some embodiments, the housing display is a touch screen display and the displayed image is configured to be enlarged or reduced by human touch to the touch screen display.

In some embodiments, the housing display is used for focusing an image of a surface of a subject acquired by the two-dimensional imager.

In some embodiments, the attachment device has a maximum power consumption of less than 15 watts, less than 10 watts, or less than 5 watts. In some embodiments, the source of power for the attachment device is a battery (e.g., a rechargeable battery).

In some embodiments, the communications interface of the attachment device comprises a first communications interface, and attachment of the housing to the external device brings the first communications interface in direct physical and electrical communication with a second communications interface of the external device thereby enabling instructions to be sent directly to the second communications interface from the first communications interface in accordance with the hyperspectral/multispectral imaging regimen. In some such embodiments, the source of power is a battery and the battery is recharged through the first communications interface by electrical power obtained from the second communications interface of the external device.

In some embodiments, the first and second filters are characterized by corresponding first and second central wavelengths, and the first and second central wavelengths are separated by at least 10 nm, or by at least 25 nm.

In some embodiments, the first and second filters are characterized by corresponding first and second central wavelengths, and the first and second central wavelengths are separated by at least 50 nm.

In some embodiments, the first and second filters are characterized by corresponding first and second central wavelengths, and the first and second central wavelengths are separated by at least 100 nm.

In some embodiments, the first filter is a shortpass filter and the second filter is a longpass filter.

In some embodiments, the instructions sent via the communications interface to the light source to power on instruct the light source to power on for no longer than one second, no longer than 500 milliseconds, or no longer than 250 milliseconds.

In some embodiments, the plurality of filters comprises four or more bandpass filters, with each bandpass filter in the four or more bandpass filters characterized by a different central wavelength. In some embodiments, the plurality of filters comprises six or more bandpass filters, with each bandpass filter in the six or more bandpass filters characterized by a different central wavelength. In some embodiments, the plurality of filters comprises eight or more bandpass filters, with each bandpass filter in the eight or more bandpass filters characterized by a different central wavelength.

In some embodiments, the first wavelength range is 40 nm or less and the second wavelength range is 40 nm or less. In some embodiments, the first wavelength range is 20 nm or less and the second wavelength range is 20 nm or less. In some embodiments, the first wavelength range is 10 nm or less and the second wavelength range is 10 nm or less.

In some embodiments, the non-transitory instructions for implementing the hyperspectral/multispectral imaging regimen are stored in one or more memory chips of the circuit board.

In some embodiments, the communications interface is configured to receive the instructions for implementing a hyperspectral/multispectral imaging regimen from the external device and the at least portion of the regimen is stored in one or more memory chips of the circuit board.

In some embodiments, the filter housing comprises a filter wheel and the motor drives the filter wheel about the axis to thereby selectively intercept the first optical path with a predetermined one of the filters in the plurality of filters.

In some embodiments, the filter housing comprises a filter strip, and the motor drives the filter strip along the axis to thereby selectively intercept the first optical path with a predetermined one of the filters in the plurality of filters.

Non-Transitory Computer Readable Storage Medium Embodiments. Another aspect of the present disclosure provides a non-transitory computer readable storage medium comprising instructions for execution by one or more processors to perform a hyperspectral/multispectral imaging regimen comprising providing motor step function instructions that instruct a motor to move a filter housing in a casing to a first position. The filter housing comprises a plurality of filters. The first position causes a first filter in the plurality of filters to selectively intercept a first optical path through a casing housing the plurality of filters. The first filter is transparent to a first wavelength range and opaque to other wavelengths in at least the visible spectrum. The hyperspectral/multispectral imaging regimen further comprises instructing a light source to power on and subsequently or concurrently instructing a two-dimensional imager to acquire a first image of light passing through the first optical path when the filter housing is in the first position. the hyperspectral/multispectral imaging regimen further comprises providing motor step function instructions that instruct the motor to move the filter wheel to a second position, after the first image is acquired. The second position causes a second filter in the plurality of filters to selectively intercept the first optical path (and causes the first filter to no longer intercept the first optical path). The second filter is transparent to a second wavelength range and opaque to other wavelengths in at least the visible spectrum. The first wavelength range is other than the second wavelength range. The hyperspectral/multispectral imaging regimen instructs the two-dimensional imager to acquire a second image of light passing through the first optical path when the filter wheel is in the second position. The hyperspectral/multispectral imaging regimen combines at least the first image and the second image to form a hyperspectral/multispectral image.

In some embodiments, the two-dimensional imager is a charge-coupled device (CCD), a complementary metal-oxide-semiconductor (CMOS), a photo-cell, or a focal plane array.

In some embodiments, the plurality of filters comprises at least one bandpass filter. In some embodiments, the plurality of filters comprises at least one longpass filter or at least one shortpass filter.

In some embodiments, the motor step functions are communicated wirelessly in accordance with a transmission protocol (e.g., Bluetooth, ZigBee, or 802.11).

In some embodiments, the method further comprises displaying the first image, the second image or the hyperspectral/multispectral image.

In some embodiments, the first and second filters are characterized by corresponding first and second central wavelengths, and the first and second central wavelengths are separated by at least 10 nm or by at least 25 nm.

In some embodiments, the first filter is a shortpass filter and the second filter is a longpass filter.

In some embodiments, the first and second filters are characterized by corresponding first and second central wavelengths, and the first and second central wavelengths are separated by at least 50 nm, or by at least 100 nm.

In some embodiments, the instructions to power the light source on instruct the light source to power on for no longer than one second, for no longer than 500 milliseconds, or for no longer than 250 milliseconds.

In some embodiments, the plurality of filters comprises four or more bandpass filters with each bandpass filter in the four or more bandpass filters characterized by a different central wavelength. In some embodiments, the plurality of filters comprises six or more bandpass filters with each bandpass filter in the six or more bandpass filters characterized by a different central wavelength. In some embodiments, the plurality of filters comprises eight or more bandpass filters, with each bandpass filter in the eight or more bandpass filters characterized by a different central wavelength.

In some embodiments, the first wavelength range is 40 nm or less and the second wavelength range is 40 nm or less. In some embodiments, the first wavelength range is 20 nm or less and the second wavelength range is 20 nm or less. In some embodiments, the first wavelength range is 10 nm or less and the second wavelength range is 10 nm or less.

In some embodiments, the filter housing comprises a filter wheel, and the motor drives the filter wheel about an axis to thereby selectively intercept the first optical path with a predetermined one of the filters in the plurality of filters. In alternative embodiments, the filter housing comprises a filter strip and the motor drives the filter strip along an axis to thereby selectively intercept the first optical path with a predetermined one of the filters in the plurality of filters.

Disclosed Methods. Another aspect of the present disclosure provides a method for performing a hyperspectral/multispectral imaging regimen at a device comprising one or more processors, memory storing one or more programs for execution by the one or more processors, a light source, a communications interface, and a two-dimensional imager. The device is attached to an attachment device and the one or more programs singularly or collectively communicate, through the communications interface, motor step function instructions that instruct a motor of the attachment device to move a filter housing of the attachment device in a casing of the attachment device to a first position. The filter housing comprises a plurality of filters, the first position causes a first filter in the plurality of filters to selectively intercept a first optical path through the filter housing, and the first filter is transparent to a first wavelength range and opaque to other wavelengths in at least the visible spectrum. The one or more programs further singularly or collectively instruct the light source to power on. The one or more programs further singularly or collectively instruct the two-dimensional imager to acquire a first image of light passing through the first optical path when the filter wheel is in the first position. The one or more programs further singularly or collectively communicate, through the communications interface, motor step function instructions that instruct the motor to move the filter housing to a second position, after the first image is acquired. The second position causes a second filter in the plurality of filters to selectively intercept the first optical path. The second filter is transparent to a second wavelength range and opaque to other wavelengths in at least the visible spectrum. The first wavelength range is other than the second wavelength range. The one or more programs further singularly or collectively instruct the two-dimensional imager to acquire a second image of light passing through the first optical path when the filter wheel is in the second position. The one or more programs further singularly or collectively combine at least the first image and the second image to form a hyperspectral/multispectral image.

In some embodiments, the two-dimensional imager is selected a charge-coupled device (CCD), a complementary metal-oxide-semiconductor (CMOS), a photo-cell, or a focal plane array. In some embodiments, the plurality of filters comprises at least one bandpass filter. In some embodiments, the plurality of filters comprises at least one longpass filter or at least one shortpass filter.

In some embodiments, the communication interface comprises a wireless signal transmission element and the motor step function instructions are sent by the wireless signal transmission element. In some embodiments, the wireless signal transmission element is a Bluetooth transmission element, a ZigBee transmission element, or a Wi-Fi transmission element.

In some embodiments, the communications interface comprises a first communications interface, and the device attaches to the attachment device thereby bringing the first communications interface in direct physical and electrical communication with a second communications interface of the attachment device thereby enabling instructions to be sent directly to the second communications interface from the first communications interface.

In some embodiments, the device is a smart phone, a personal digital assistant (PDA), an enterprise digital assistant, a tablet computer, or a digital camera.

In some embodiments, the device further comprises a display, and device, and the one or more programs singularly or collectively direct for the display of the first image, the second image, or a hyperspectral/multispectral image on the display. In some such embodiments, the display is a touch screen display, and the displayed image is enlargeable or reducible by human touch to the touch screen display. In some embodiments, the display is configured for focusing an image of a surface of a subject acquired by the two-dimensional imager.

In some embodiments, the attachment device has a maximum power consumption of less than 15 watts, less than 10 watts, or less than 5 watts. In some embodiments, a source of power for the attachment device is a battery (e.g., a rechargeable battery).

In some embodiments, the communications interface comprises a first communications interface, attachment of the device to the attachment device brings the first communications interface in direct physical and electrical communication with a second communications interface of the attachment device thereby enabling the motor step function instructions to be sent directly to the second communications interface from the first communications interface, a source of power of the attachment device is a battery, and the battery is recharged through the first communications interface by electrical power obtained from the second communications interface of the external device.

In some embodiments, the first and second filters are characterized by corresponding first and second central wavelengths, and the first and second central wavelengths are separated by at least 10 nm or by at least 25 nm.

In some embodiments, the first and second filters are characterized by corresponding first and second central wavelengths, and the first and second central wavelengths are separated by at least 50 nm or by at least 100 nm.

In some embodiments, the first filter is a shortpass filter and the second filter is a longpass filter.

In some embodiments, the instructing the light source to power on instructs the light source to power on for no longer than one second, for no longer than 500 milliseconds, or for no longer than 250 milliseconds.

In some embodiments, the plurality of filters comprises four or more bandpass filters with each bandpass filter in the four or more bandpass filters characterized by a different central wavelength. In some embodiments, the plurality of filters comprises six or more bandpass filters with each bandpass filter in the six or more bandpass filters characterized by a different central wavelength. In some embodiments, the plurality of filters comprises eight or more bandpass filters with each bandpass filter in the eight or more bandpass filters characterized by a different central wavelength.

In some embodiments, the plurality of filters includes at least four bandpass filters with central wavelengths selected from 520±3 nm, 540±3 nm, 560±3 nm, 580±3 nm, 590±3 nm, 610±3 nm, 620±3 nm, and 660±3 nm. In some embodiments, the plurality of filters includes at least five bandpass filters with central wavelengths selected from 520±3 nm, 540±3 nm, 560±3 nm, 580±3 nm, 590±3 nm, 610±3 nm, 620±3 nm, and 660±3 nm. In some embodiments, the plurality of filters includes at least six bandpass filters with central wavelengths selected from 520±3 nm, 540±3 nm, 560±3 nm, 580±3 nm, 590±3 nm, 610±3 nm, 620±3 nm, and 660±3 nm. In some embodiments, the plurality of filters includes at least seven bandpass filters with central wavelengths selected from 520±3 nm, 540±3 nm, 560±3 nm, 580±3 nm, 590±3 nm, 610±3 nm, 620±3 nm, and 660±3 nm. In some embodiments, the plurality of filters includes at least eight bandpass filters with central wavelengths selected from 520±3 nm, 540±3 nm, 560±3 nm, 580±3 nm, 590±3 nm, 610±3 nm, 620±3 nm, and 660±3 nm In some embodiments, the first wavelength range is 40 nm or less and the second wavelength range is 40 nm or less. In some embodiments, the first wavelength range is 20 nm or less and the second wavelength range is 20 nm or less. In some embodiments, the first wavelength range is 10 nm or less and the second wavelength range is 10 nm or less.

In some embodiments, the filter housing comprises a filter wheel and the motor drives the filter wheel about an axis to thereby selectively intercept the first optical path with a predetermined one of the filters in the plurality of filters. In alternative embodiments, the filter housing comprises a filter strip, and the motor drives the filter strip along an axis to thereby selectively intercept the first optical path with a predetermined one of the filters in the plurality of filters.

DETAILED DESCRIPTION

Figure 1:
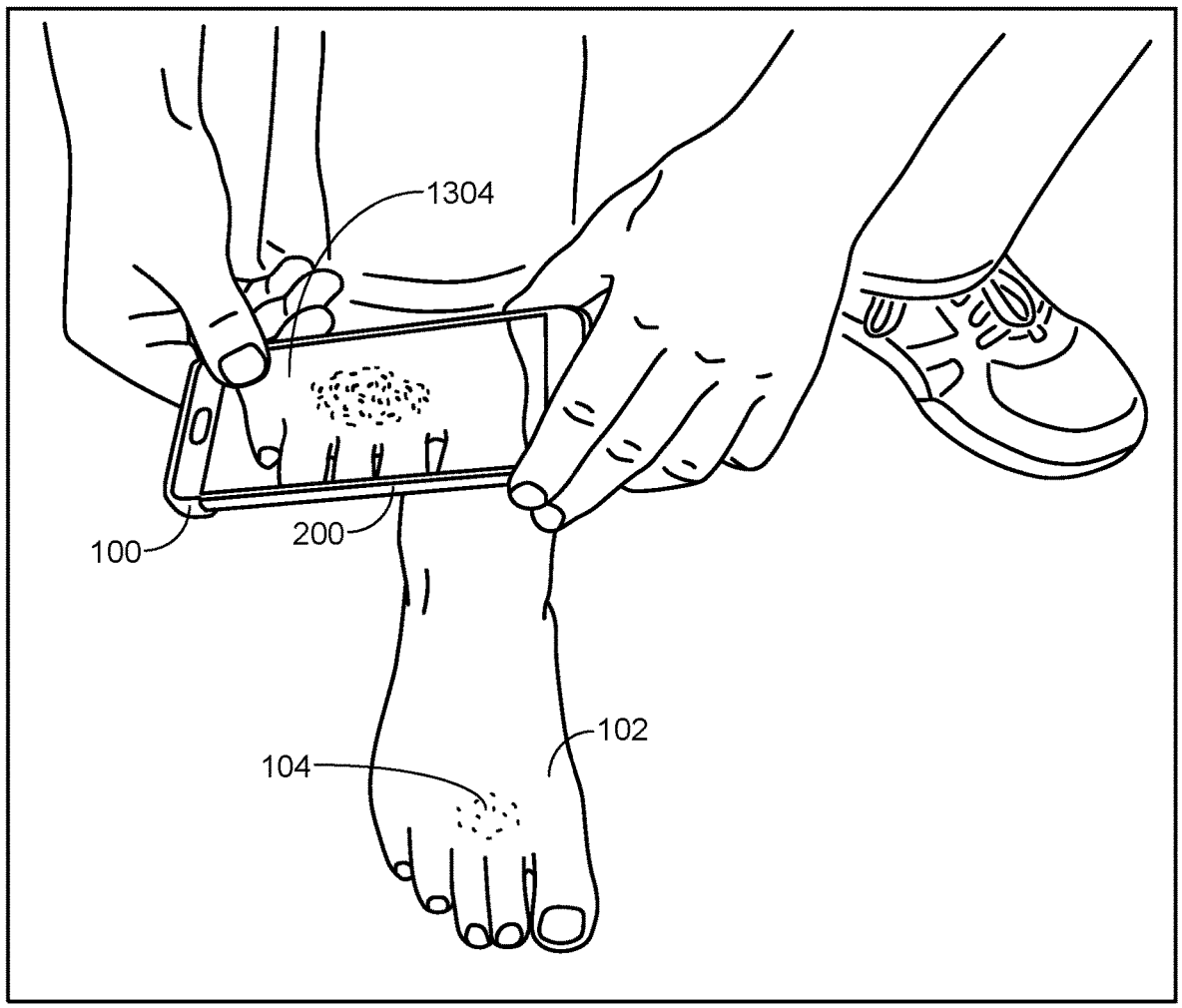
FIG. 1 illustrates an attachment device, attached to an external device, such as a mobile device, for imaging discrete wavelength bands of a region of interest of a subject in accordance with an embodiment of the present disclosure.

Introduction. Hyperspectral and multispectral imaging are related techniques in larger class of spectroscopy commonly referred to as spectral imaging or spectral analysis. Typically, hyperspectral imaging relates to the acquisition of a plurality of images, each image representing a narrow spectral band collected over a continuous spectral range, for example, 20 spectral bands having a FWHM bandwidth of 20 nm each, covering from 400 nm to 800 nm. In contrast, multispectral imaging relates to the acquisition of a plurality of images, each image representing a narrow spectral band collected over a discontinuous spectral range. For the purposes of the present disclosure, the terms "hyperspectral" and "multispectral" are used interchangeably and refer to a plurality of images, each image representing a narrow spectral band (having a FWHM bandwidth of between 10 nm and 30 nm, between 5 nm and 15 nm, between 5 nm and 50 nm, less than 100 nm, between 1 and 100 nm, etc.), whether collected over a continuous or discontinuous spectral range.

As used herein, the terms "narrow spectral range" or "narrowband" are used interchangeably and refer to a continuous span of wavelengths, typically consisting of a FWHM spectral band of no more than about 100 nm. In certain embodiments, narrowband radiation consists of a FWHM spectral band of no more than about 75 nm, 50 nm, 40 nm, 30 nm, 25 nm, 20 nm, 15 nm, 10 nm, 5 nm, 4 nm, 3 nm, 2 nm, or 1 nm.

Hyperspectral imaging involves imaging narrow spectral bands over a continuous spectral range, and producing the spectra of all pixels in the scene of interest. So a sensor with only 20 bands can also be hyperspectral when it covers the range from 500 to 700 nm with 20 bands each 10 nm wide. (While a sensor with 20 discrete bands covering the visible spectrum, near-infrared, short-wavelength infrared, mid-wavelength infrared, and long-wavelength infrared would be considered multispectral.)

Among other aspects, the present disclosure provides methods and systems that enable the capture of hyperspectral/multispectral images. The architecture of the disclosed hyperspectral/multispectral systems provided herein (e.g., attachment device), provides several advantages over systems and methods of hyperspectral/multispectral imaging known in the art. For example, the systems and methods provided herein allow for mobile cost effective capture of images at a range of wavelengths without the need for a tunable filter or other conventional costly imaging equipment. The disclosed systems and methods also enable shorter subject illumination times, shorter image exposure times, overall more rapid hyperspectral/multispectral imaging, lower power consumption, and lower manufacturing costs, to name a few benefits.

Specifically, the present application provides hyperspectral/multispectral systems and methods that make use of an attachment device comprising a cover, with first and second windows, affixed to a backing, with third and fourth windows, thereby forming a casing. The first and third windows form a first optical path with light entering the third window passing through the first window. The second and fourth windows form a second optical path with light entering the second window passing through the fourth window. A filter housing with a plurality of filters is driven by a motor so that the filters intercept the first optical path in accordance with an imaging regimen electronically stored in the casing interior. The imaging regimen communicates instructions, via a communications interface of the attachment device, to an imager and light source of an external device, to which the attachment device is attached, thereby controlling these components in accordance with the regimen. As opposed to imaging systems that rely on line scanning to capture images at separate wavelengths (e.g., systems employing a prism or diffraction grating), the systems described herein can capture true two-dimensional co-axial images by sequentially resolving images of the object at different wavelengths by movement of the filter housing.

Hyperspectral/multispectral systems that capture images at different wavelengths using detectors that are slightly offset from one another (e.g., at two or more detectors positioned next to each other at the end of an optical path) require extensive computational power to index and align the images with one another. Similarly, images captured using imaging systems that rely on co-boring of multiple objective lenses (e.g., where the center of each objective lens points to a common target), must be mathematically corrected so that information obtained from each objective lens transposes one-to-one. Advantageously, the imaging systems provided herein provide true co-axial aligned images, reducing the computation burden and thus increasing the speed at which hyperspectral/multispectral data can be processed.

In one embodiment, the systems and methods provided herein are useful for hyperspectral/multispectral medical imaging and diagnostics. For example, the disclosed attachment device can be mounted on a mobile phone for easy manipulation by a healthcare professional.

In another embodiment, the systems and methods provided herein are useful for other hyperspectral/multispectral applications such as satellite imaging (e.g., for geological sensing of minerals, agricultural imaging, and military surveillance), remote chemical imaging, and environmental monitoring. For example, the disclosed attachment device can be mounted inside a satellite or other telescopic apparatus for remote hyperspectral/multispectral imaging.

In some embodiments, the attachment devices disclosed herein are configured to allow for tissue oximetry, when attached to an external device. Exemplary methods for performing tissue oximetry, requiring capture of only a limited number of images at different wavelengths, are disclosed in U.S. patent application Ser. No. 15/267,090, the content of which is expressly incorporated by reference herein, in its entirety, for all purposes.

In some embodiments, the attachment devices disclosed herein are configured to facilitate acquisition of a set of four to twelve images (e.g., 4, 5, 6, 7, 8, 9, 10, 11, or 12 images) at different narrow-bands of light between about 400 nm and about 700 nm.

In some embodiments, the attachment devices disclosed herein are configured to facilitate acquisition of a set of four to twelve images (e.g., 4, 5, 6, 7, 8, 9, 10, 11, or 12 images) at different narrow-bands of light between about 500 nm and about 680 nm.

In some embodiments, the attachment devices disclosed herein are configured to facilitate acquisition of a set of four to twelve images (e.g., 4, 5, 6, 7, 8, 9, 10, 11, or 12 images) at different narrow-bands of light, where at least four of the narrow bands (e.g., 4, 5, 6, 7, or 8 of the narrow-bands of light) have central wavelengths selected from 520±3 nm, 540±3 nm, 560±3 nm, 580±3 nm, 590±3 nm, 610±3 nm, 620±3 nm, and 660±3 nm.

In some embodiments, the attachment devices disclosed herein are configured to facilitate acquisition of a set of four to twelve images (e.g., 4, 5, 6, 7, 8, 9, 10, 11, or 12 images) at different narrow-bands of light, where at least four of the narrow bands (e.g., 4, 5, 6, 7, or 8 of the narrow-bands of light) have central wavelengths selected from 510±3 nm, 530±3 nm, 540±3 nm, 560±3 nm, 580±3 nm, 590±3 nm, 620±3 nm, and 660±3 nm.

In some embodiments, the attachment devices disclosed herein are configured to facilitate acquisition of a set of four to twelve images (e.g., 4, 5, 6, 7, 8, 9, 10, 11, or 12 images) at different narrow-bands of light, where at least four of the narrow bands (e.g., 4, 5, 6, 7, or 8 of the narrow-bands of light) have central wavelengths selected from 520±3 nm, 540±3 nm, 560±3 nm, 580±3 nm, 590±3 nm, 610±3 nm, 620±3 nm, and 640±3 nm.

In some embodiments, the attachment devices disclosed herein are configured to facilitate acquisition of a set of four to twelve images (e.g., 4, 5, 6, 7, 8, 9, 10, 11, or 12 images) at different narrow-bands of light, where at least four of the narrow bands (e.g., 4, 5, 6, 7, or 8 of the narrow-bands of light) have central wavelengths selected from 500±3 nm, 530±3 nm, 545±3 nm, 570±3 nm, 585±3 nm, 600±3 nm, 615±3 nm, and 640±3 nm.

In some embodiments, each narrow band of light has a full width at half maximum ("FWHM") of less than 25 nm, 20 nm, 15 nm, 10 nm, or 5 nm. In some embodiments, each narrow-band of light having a central wavelength below 600 nm has a full width at half maximum of less than 20 nm, 15 nm, 10 nm, or 5 nm and each narrow-band of light having a central wavelength at or above 600 nm has a full width at half maximum of less than 25 nm, 20 nm, or 15 nm (e.g., because of diminished sensitivity of photo detectors above 600 nm, images collected at higher wavelengths have larger FWHM).

Systems for Hyperspectral/Multispectral Imaging—The Attachment Device. FIG. 1 illustrates an attachment device 100 attached to an external device 200 (e.g. mobile device) for imaging discrete wavelength bands of a region of interest 104 of a subject 102 in accordance with an embodiment of the present disclosure. In some embodiments the subject is human. In some embodiments the region of interest is a portion of the skin of the subject. In some embodiments the region of interest is a portion of the skin of the subject. In some embodiments the region of interest is a portion of the epidermis of the subject. In some embodiments the region of interest is a portion of the dermis of the subject. In some embodiments the region of interest is a region of the subcutaneous fat of the subject. In some embodiments the region of interest is a first region of the epidermis and a first region of dermis of the subject that underlies the first region of the epidermis. In some embodiments, the region of interest is less than 100 square centimeters, less than 50 square centimeters, less than 25 square centimeters or less than 20 square centimeters.

Figure 2:
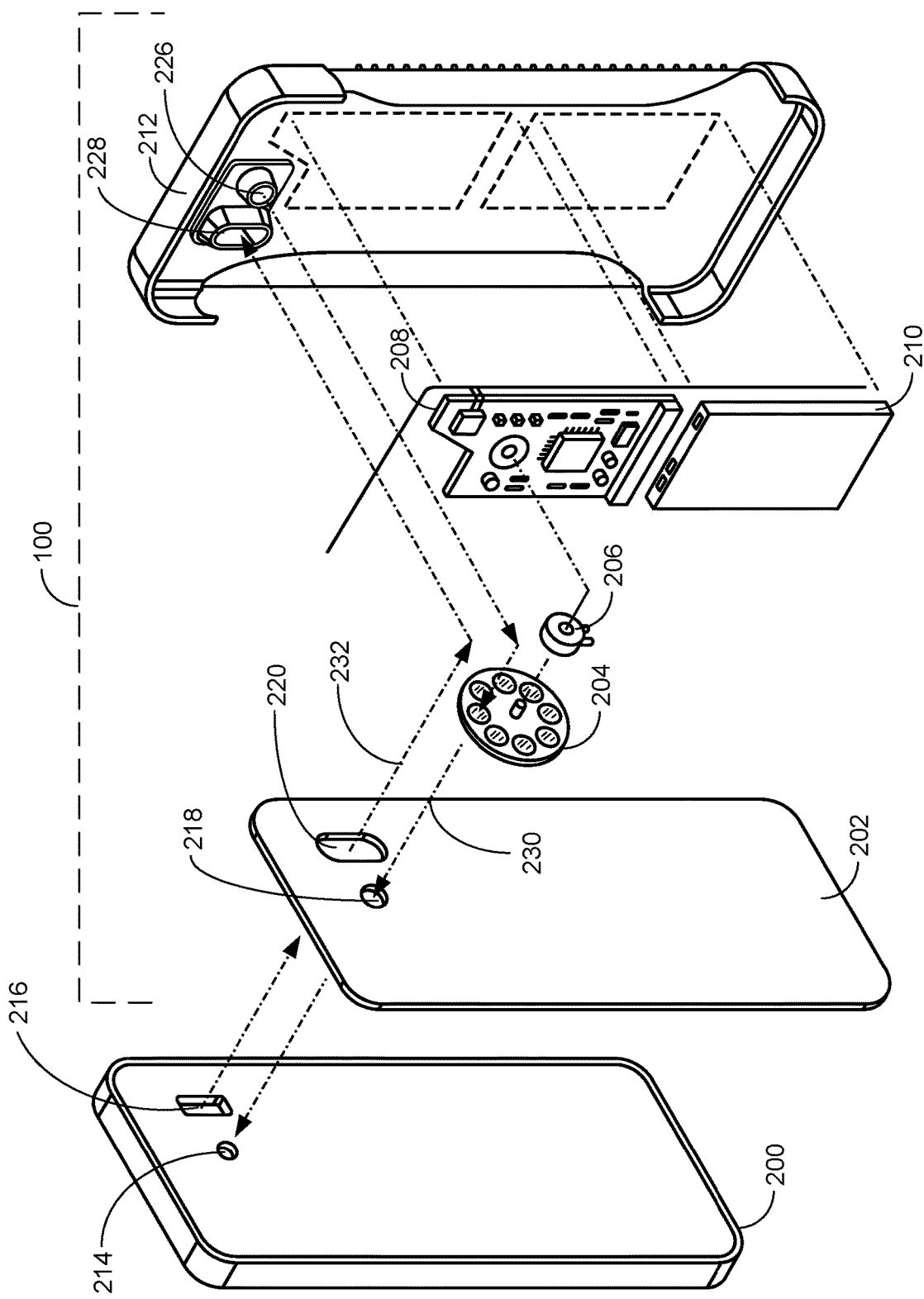
FIG. 2 illustrates the attachment device of FIG. 1, and how the attachment device is attached to the external device in accordance with an embodiment of the present disclosure.

FIG. 2 shows a schematic illustration of the internal hardware of an attachment device 100 according to some embodiments. The attachment device 100 includes a cover 202 having a first optical window 218 and a second optical window 220. The attachment device 100 further includes a backing 212 having a third optical window 226 and a fourth optical window 228. The cover 202 is affixed onto the backing 212 thereby forming a casing having an interior.

The first 218 and third 226 optical windows form a first optical path 230 within the casing interior, in which light entering the third optical window 226 passes through the first optical window 218. The second 220 and fourth 228 optical window form a second optical path 232 within the casing interior, in which light entering the second optical window passes 220 through the fourth optical window. In some such embodiments light originates from light 216 of external device 200, passes through the second optical window passes 220 along the second optional path 232, and out fourth optical window 228. Some of this light is reflected from the region of interest 104 of a subject and passes back through the third optical window 226, along the first optical path 230 through the first optical window 218 and into an imager 214 (e.g., a two-dimensional imager such as a charge-coupled device, a complementary metal-oxide-semiconductor, a photo-cell, or a focal plane array). In some embodiments, a portion of the light is reflected by the surface of the skin of the subject whereas a portion of the light is transmitted through the air-stratum corneum interface of the subject and absorbed by chromophores (e.g., melanin and hemoglobin) in the epidermis and dermis or scattered by cells or collagen fibers present throughout the epidermis and dermis. Therefore, in some embodiments, the observed skin reflectance that passes back through the third optical window 226 in some embodiments is the sum of the surface reflection, also called Fresnel reflection, and the diffuse reflectance. The latter corresponds to light that entered the tissue and reemerged out of the tissue toward the detector. If light 216 is polarized such that the region of interest 104 of the subject 102 is illuminated by polarized light, the light reflected by the surface remains polarized. However, the reemerging light is depolarized due to multiple scatterings in the tissue. See, for example, Yudovsky et al, 2010, J. Diabetes Sci Technolol. 1099-1113, which is hereby incorporated by reference in its entirety.

Figure 3:
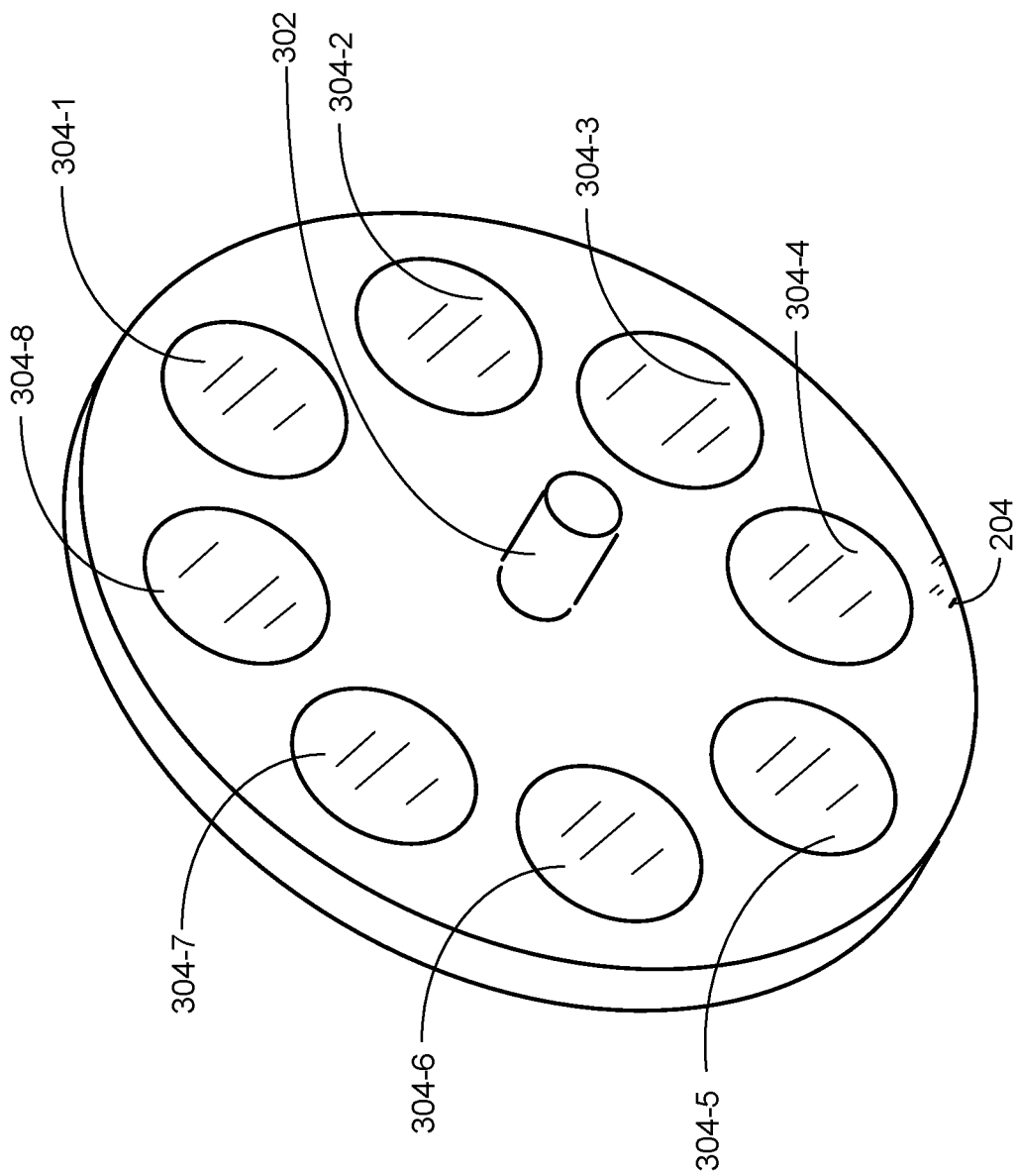
FIG. 3 illustrates a filter housing that comprises a filter wheel in the attachment device of FIG. 2, in accordance with an embodiment of the present disclosure.

As disclosed in FIG. 2, attachment device 100 includes a filter housing 204 in the interior of the casing. FIG. 3 illustrates an enlarged view of the filter housing 204 in accordance with the embodiment of FIG. 2. As illustrated in FIG. 3, the filter housing 204 comprises a filter wheel which, in turn, comprises a plurality of filters 304. Each filter in the plurality of filters is characterized by a wavelength range in a plurality of wavelength ranges. The filter housing is moveable about axis 302 to thereby selectively intercept the first optical path 230. A first filter 304-1 in the plurality of filters 304 is characterized by a first wavelength range in the plurality of wavelength ranges such that the first filter 304-1 is transparent to the first wavelength range and opaque to other wavelengths in at least the visible spectrum. Accordingly, in some embodiments, the filter housing 204 comprises a filter wheel and a motor 206 drives the filter wheel about an axis 304 to thereby selectively intercept the first optical path 230 with a predetermined one of the filters 304 in the plurality of filters.

A second filter 304-2 in the plurality of filters 304 is characterized by a second wavelength range in the plurality of wavelength ranges, such that the second filter 304-2 is transparent to the second wavelength range and opaque to other wavelengths in at least the visible spectrum. Furthermore, the first wavelength range 304-1 is other than the second wavelength range 304-2. In some embodiments the first wavelength range 304-1 overlaps the second wavelength range 304-2. In some embodiments the first wavelength range 304-1 does not overlap the second wavelength range 304-2. In some the first wavelength range is 40 nm or less and the second wavelength range is 40 nm or less. In some the first wavelength range is 20 nm or less and the second wavelength range is 20 nm or less. In some the first wavelength range is 10 nm or less and the second wavelength range is 10 nm or less.

In some embodiments, the plurality of filters 304 comprises at least one bandpass filter. In some embodiments, the plurality of filters 304 comprises at least one longpass filter and/or at least one shortpass filter. In some embodiments the first 304-1 and second 304-2 filters are characterized by corresponding first and second central wavelengths, and the first and second central wavelengths are separated by at least 10 nm, at least 25 nm, at least 50 nm, or at least 100 nm. In some embodiments, the first filter 304-1 is a shortpass filter and the second filter 304-2 is a longpass filter. In some embodiments, the plurality of filters comprises four or more bandpass filters and each bandpass filter in the four or more bandpass filters is characterized by a different central wavelength. In some embodiments, the plurality of filters comprises six or more bandpass filters and each bandpass filter in the six or more bandpass filters is characterized by a different central wavelength. In some embodiments, the plurality of filters comprises eight or more bandpass filters and each bandpass filter in the eight or more bandpass filters is characterized by a different central wavelength.

As disclosed in FIG. 2, attachment device 100 includes a motor 206 in the interior of the casing. The motor 206 is configured to move the filter housing 204 in accordance with a hyperspectral/multispectral imaging regimen. For instance, an exemplary hyperspectral/multispectral imaging regimen comprises instructions for 8. The attachment device of any one of claims 1-7, wherein the hyperspectral/multispectral imaging regimen comprises instructions for driving the filter housing to a first position in which the first filter 304-1 selectively intercepts the first optical path 230, communicating instructions, via a communications interface (not shown), to the light source 216 of the external device 200 to power on, communicating instructions, via the communications interface, to the imager 214 of the external device 200 to acquire a first image of light passing through the first optical path 230 when the filter housing 204 is in the first position, driving, after the first image is acquired, the filter housing 204 to a second position in which the second filter 304-2 selectively intercepts the first optical path 230 and the first filter 304-1 no longer intercepts the first optical path and communicating instructions, via the communications interface, to the two-dimensional imager 214, to acquire a second image of light passing through the first optical path when the filter housing 204 is in the second position. This process continues until all the filter 304 called for by the regimen have been used to capture an image. The images are then combined in accordance with the regimen. In some embodiments, the regimen calls for the use of all of the filters, meaning that an image is taken using each and every filter in the plurality of filters on the filter housing 204. In some embodiments, the regimen calls for the use of only some of the filters, meaning that an image is taken using each and every filter in a subset of the plurality of filters on the filter housing 204.

As disclosed in FIG. 2, attachment device 100 includes a circuit board 208 in the interior of the casing. The circuit board comprises non-transitory instructions for implementing at least a portion of a hyperspectral/multispectral imaging regimen such as the exemplary regimen disclosed above. As such, the instructions for implementing the hyperspectral/multispectral imaging regimen include instructions for driving the motor in accordance with the hyperspectral/multispectral imaging regimen.

Attachment device 100 further includes a communications interface, typically in the form of one or more circuits on the circuit board 208. The communications interface is configured to send instructions to the external device 200, in particular the imager 214 and the light source 216, to control the imager and the light source in accordance with the hyperspectral/multispectral imaging regimen, for instance in the manner described above in the exemplary hyperspectral/multispectral imaging regimen.

As disclosed in FIG. 2, the attachment device 100 is attached (e.g., reversibly attached) to the external device 200. In some embodiments, for example, the casing of the attachment device 100 is molded so that it exactly snaps onto the external device 200. In some embodiments the attachment device 100 is adhered to the external device 200 (e.g., using double sided adhesive tape or the like). In some embodiments, the external device is a smart phone, a personal digital assistant (PDA), an enterprise digital assistant, a tablet computer, or a digital camera.

In some embodiments, the attachment device 100 further includes a source of power 210 in the interior of the casing that powers the circuit board 208, the motor 206, and the communications interface (not explicitly shown). In some embodiment the source of power 210 is a battery (e.g., a rechargeable battery). In some embodiments, power 210 optionally includes a power management system, one or more power sources (e.g., battery, alternating current (AC)), a recharging system, a power failure detection circuit, a power converter or inverter, a power status indicator (e.g., a light-emitting diode (LED)) and/or any other components associated with the generation, management and distribution of power in portable devices.

Advantageously, the attachment device 100 has low power consumption requirements in some embodiments. For instance, in some embodiments, the attachment device 100 has a total maximum power consumption of less than 15 watts, less than 10 watts or less than 5 watts. In some embodiments, the attachment device 100 has a total maximum power consumption of between 10 and 15 watts, between 5 and 10 watts, or between 2 and 5 watts.

Figure 4:
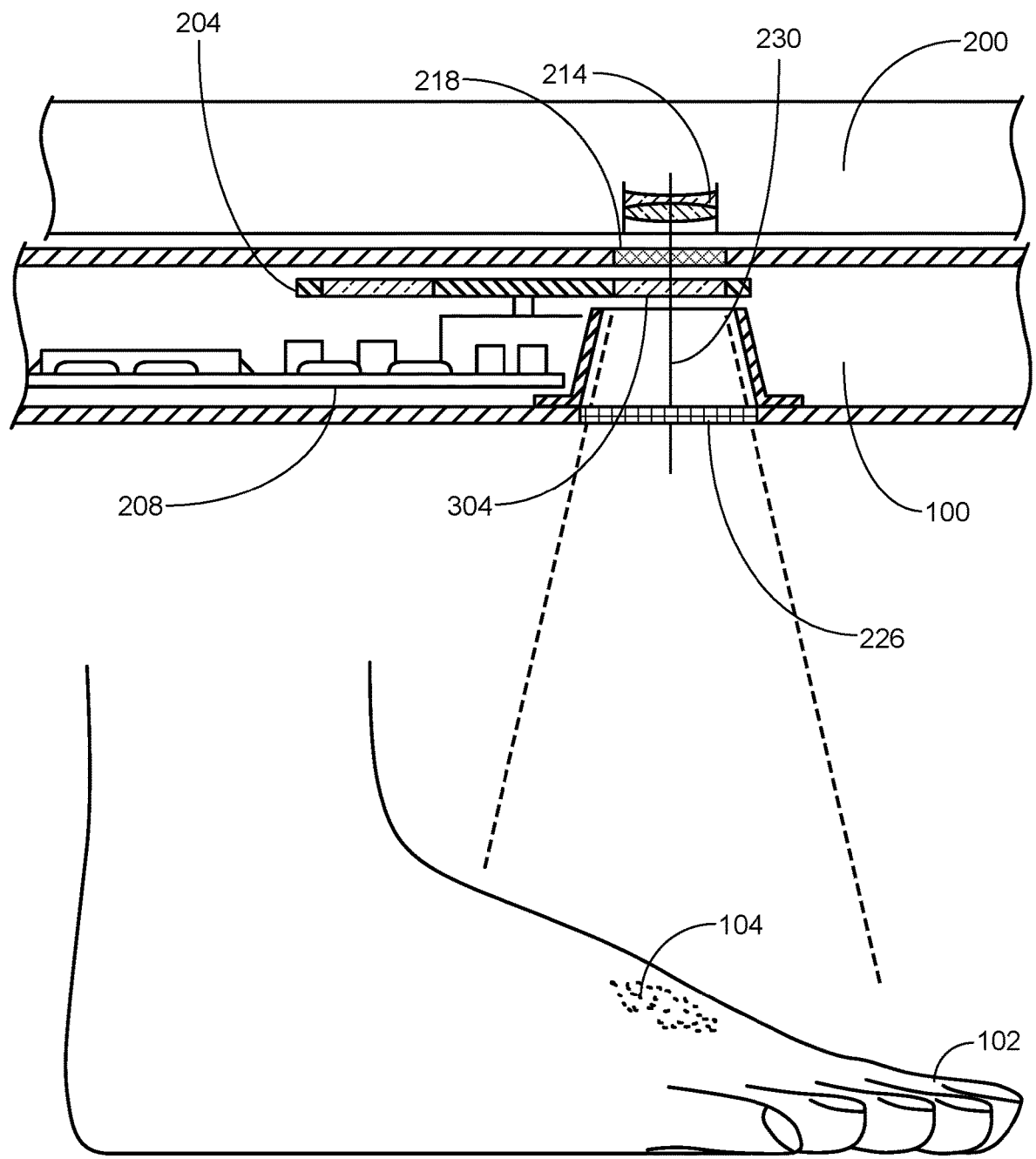
FIG. 4 provides an exploded view detailing the spatial relationship between the attachment device for imaging discrete wavelength bands of a region of interest of a subject 102, the external device, and the region of interest of the subject, in accordance with an embodiment of the present disclosure.

Turning to FIG. 4, there is disclosed an exploded view detailing the spatial relationship between the attachment device 100 for imaging discrete wavelength bands of a region of interest of a subject, the external device 200, and the region of interest 104 of the subject 102 in accordance with an embodiment of the present disclosure. As disclosed in FIG. 4, light (e.g., reflected light) from the subject passes through the third optical window 226 of the attachment device 100, traverses the first optical path 230 thereby passing through a filter 304 of the filter housing 204, passes through the first optical window 218 of the attachment device 100, to the imager 214 of the external device 200. Subsequently, in accordance with the hyperspectral/multispectral imaging regimen, the filter housing 204 is moved thereby positioning a different filter 304 of the filter housing in the first optical path 230 and a subsequent image of the region of interest is taken with the new filter in position. This process repeats itself until an image has been taken using each filter 304 of the filter housing 204 specified by the hyperspectral/multispectral imaging regimen.

Figure 8:
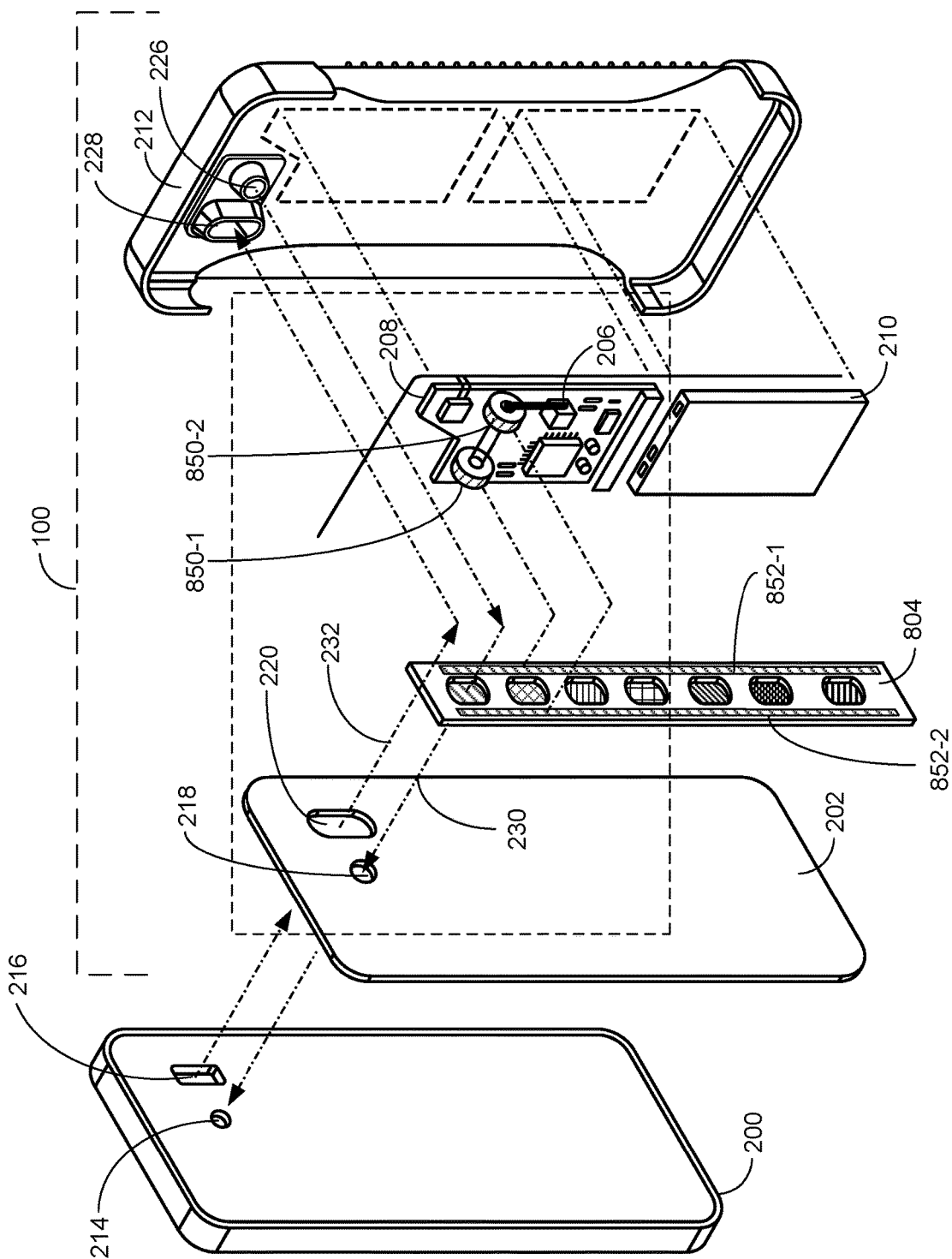
FIG. 8 illustrates the attachment device of FIG. 1, and how the attachment device is attached to the external device in accordance with another embodiment of the present disclosure.
Figure 9:
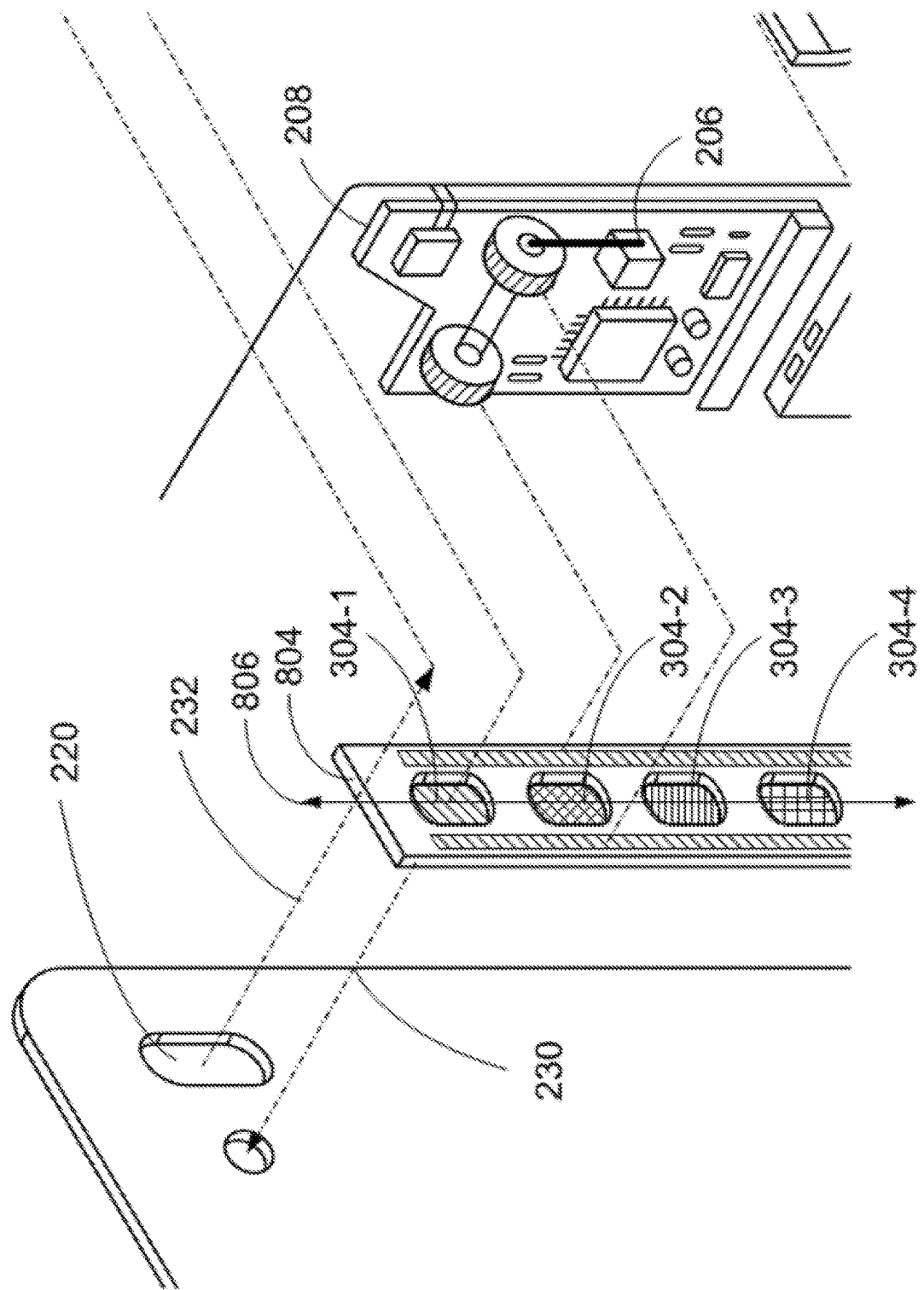
FIG. 9 illustrates a close up view of a portion of FIG. 8, illustrating a filter housing that comprises a filter strip, in accordance with an embodiment of the present disclosure.
Figure 10:
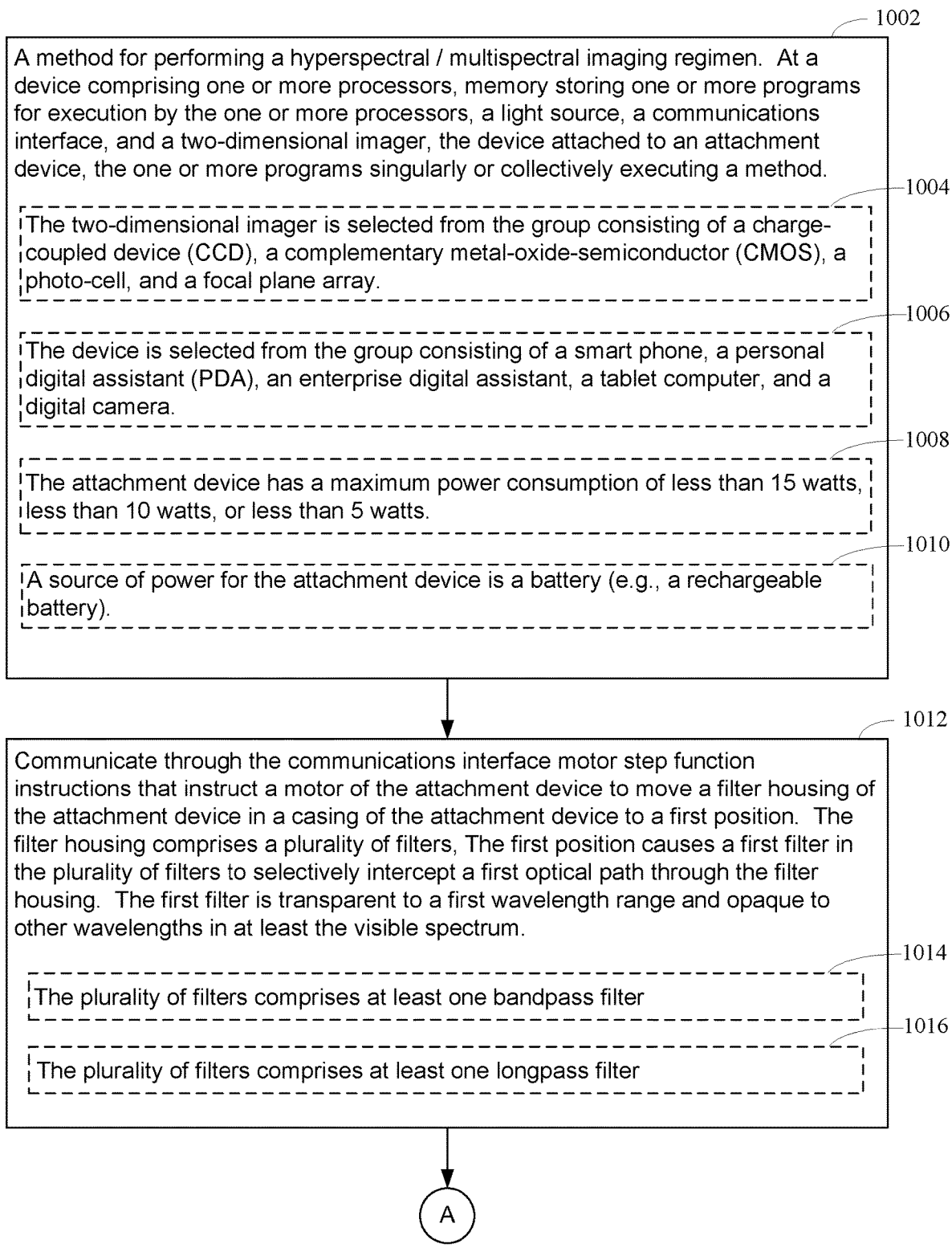
FIG. 10 illustrates a flow chart of methods for imaging discrete wavelength bands using a device in accordance with an embodiment of the present disclosure.
Figure 11:
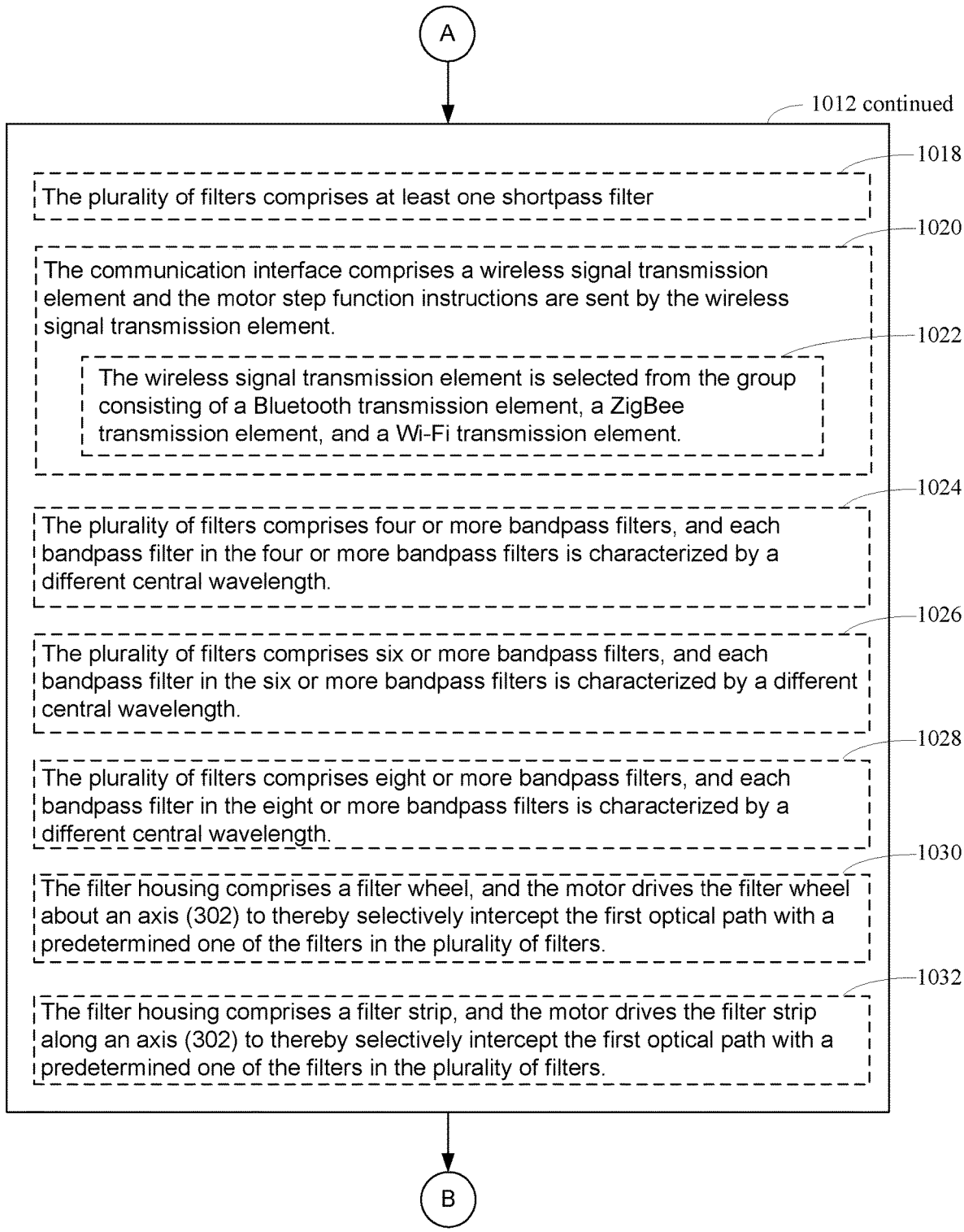
FIG. 11 illustrates a continuation of the flow chart of FIG. 10 in accordance with an embodiment of the present disclosure.
Figure 12:
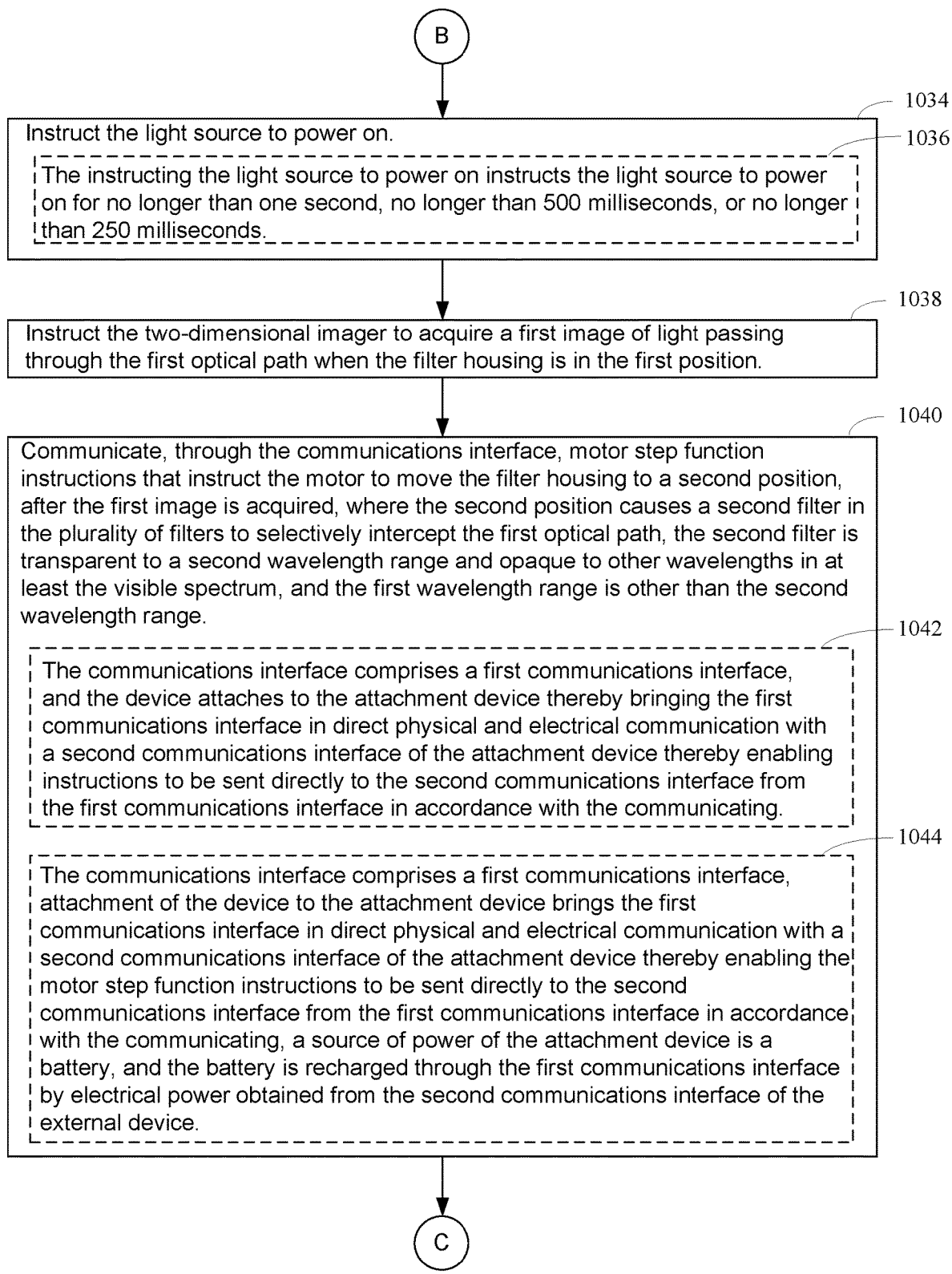
FIG. 12 illustrates a continuation of the flow chart of FIG. 11 in accordance with an embodiment of the present disclosure.
Figure 13:
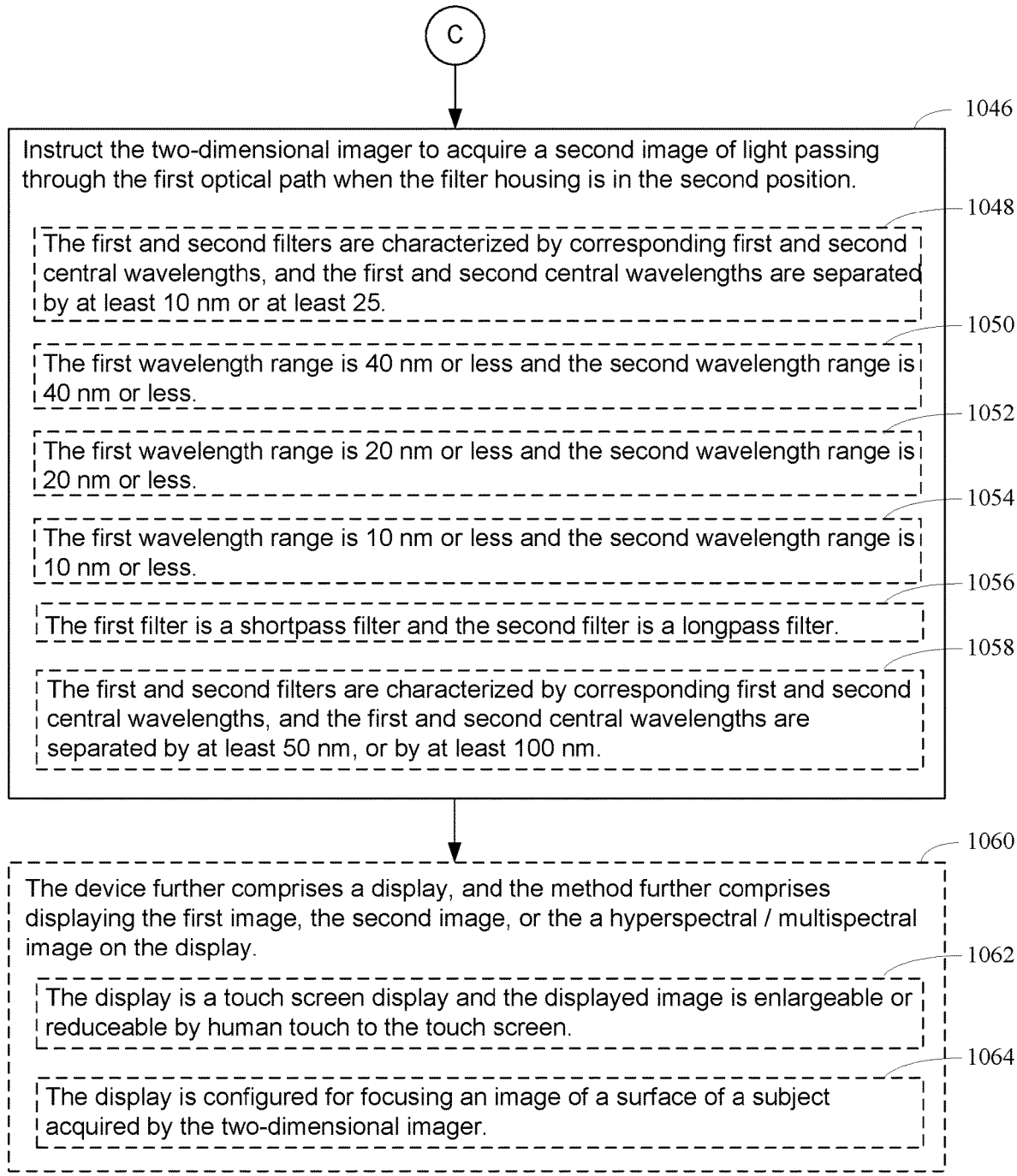
FIG. 13 illustrates a continuation of the flow chart of FIG. 12 in accordance with an embodiment of the present disclosure.

FIG. 8 illustrates an attachment device 100 in accordance with another embodiment of the present disclosure. All elements with like reference numerals to those found in FIG. 2 are not repeated here for the sake of brevity. What differs between the embodiments of the attachment device 100 of FIGS. 2 and 8 is that the filter housing (filter wheel) 204 of the attachment device of FIG. 2 is functionally replaced with the filter strip in FIG. 8. The filter strip is moved in accordance with the hyperspectral/multispectral imaging regimens in the same manner as disclosed above. Accordingly, and further referring to FIG. 9 which illustrates a close up view of a portion of FIG. 8, in the embodiment of the attachment device 100 of FIGS. 8 and 9, the motor 206 drives the filter strip 804 along the axis 806 to thereby selectively intercept the first optical path 230 with a predetermined one of the filters 304 in the plurality of filters. In particular, in the embodiment illustrate in FIG. 8, motor 206 engages gears 850-1 and 850-2 to move along respective tracks 852-1 and 852-2 causing the filter strip 804 to linearly move. However, one of skill in the art will appreciate that there are any number of ways in which the motor 206 can be configured to cause the filter strip 804 to move in a linear direction. In fact, in some embodiments, rather than using a motor on filter strip 804 the strip is moved into different positions by other movement mechanism, such as by solenoid action and the like. Accordingly, in some embodiments, the disclosed motor step function instructions are in fact instructions for such other movement mechanism. For instance, in the case where the movement is by solenoid, the disclosed motor step function instructions are instructions to move the filter housing by solenoid action. Although the axis 806 and the filter strip are shown as being along a long dimension of the attachment device 100, in fact, the present disclosure is not so limited. In some embodiments, the filter strip 804 is in fact orthogonal to the direction disclosed in FIGS. 8 and 9. In some embodiments, the filter strip 804 is in fact juxtaposed at any angle relative to the axis 806 of FIG. 9 such as a diagonal orientation. In some embodiments the filter strip 804 is forced to protrude from the casing of the attachment device 100 when in some positions.

Figure 5:
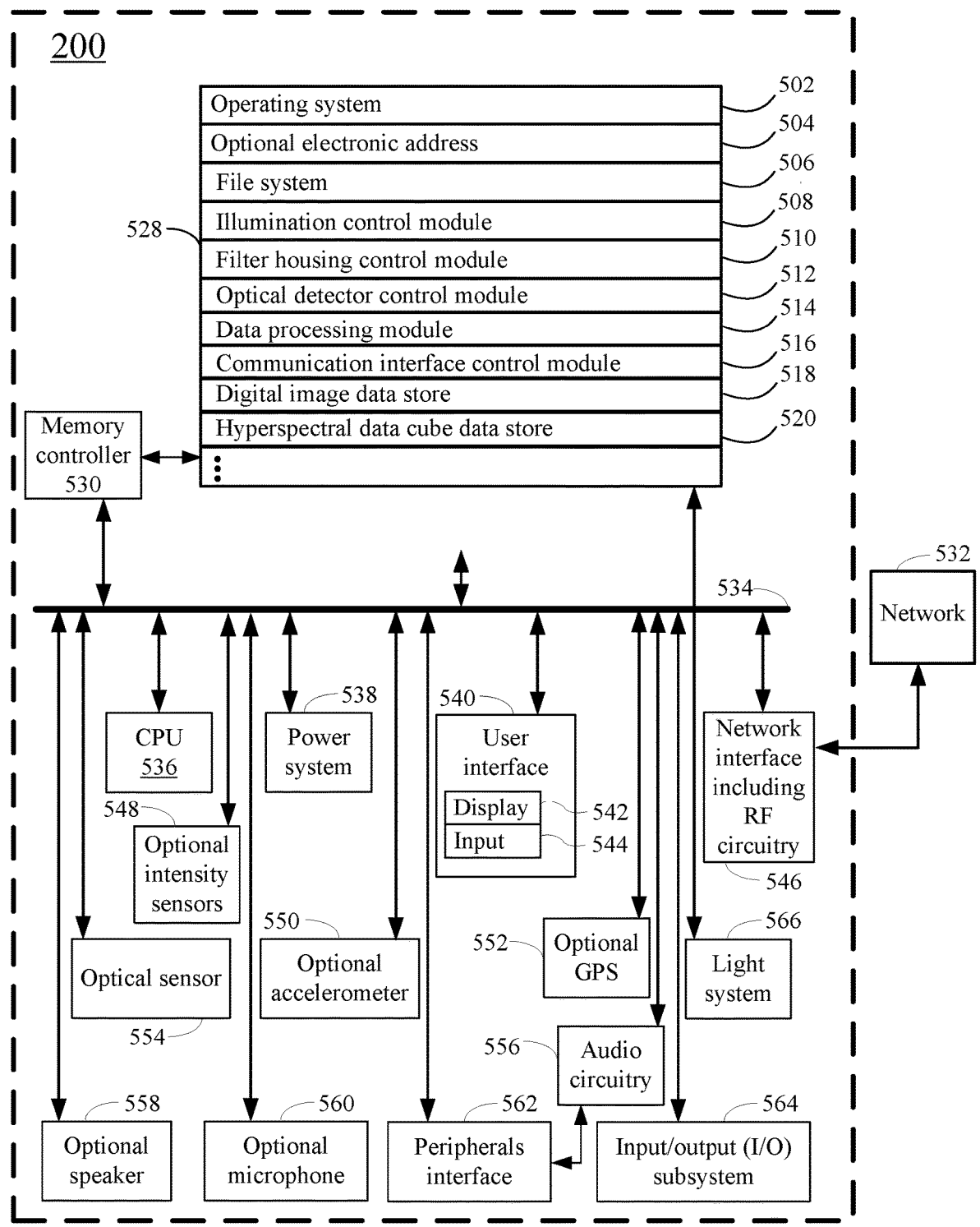
FIG. 5 illustrates exemplary components of an external device that attaches to an attachment device for imaging discrete wavelength bands of a region of interest of a subject in accordance with an embodiment of the present disclosure.

Systems for Hyperspectral/Multispectral Imaging—The External Device. FIG. 5 schematically illustrates an exemplary external device 200 in accordance with some embodiments of the present disclosure. In some embodiments exemplary external device 200 is a smart phone (e.g., an iPHONE), a personal digital assistant (PDA), an enterprise digital assistant, a tablet computer, or a digital camera. In some embodiments, external device 200 is not mobile. In some embodiments, external device 200 is mobile but is stabilized by a tripod. In some embodiments, external device 200 is mobile.

External device 200 has one or more processing units (CPU's) 536, peripherals interface 5632, memory controller 530, a network or other communications interface 546 for communication with a network 532, a memory 528 (e.g., random access memory), a user interface 540, the user interface 540 including a display 542 and input 544 (e.g., keyboard, keypad, touch screen), an optional accelerometer 550, optional audio circuitry 556, an optional speaker 558, an optional microphone 560, one or more optional intensity sensors 548 for detecting intensity of contacts on the external device 200 (e.g., a touch-sensitive surface such as a touch-sensitive display system 542 of the external device 200), optional input/output (I/O) subsystem 564, an imager 214, a light system (e.g., light) 216, one or more communication busses 534 for interconnecting the aforementioned components, and a power system 538 for powering the aforementioned components.

In some embodiments, the input 544 is a touch-sensitive display, such as a touch-sensitive surface. In some embodiments, the user interface 540 includes one or more soft keyboard embodiments. The soft keyboard embodiments may include standard (QWERTY) and/or non-standard configurations of symbols on the displayed icons.

The external device 200 optionally includes, in addition to accelerometer(s) 550, a magnetometer (not shown) and/or a GPS 552 (or GLONASS or other global navigation system) receiver for obtaining information concerning the location and orientation (e.g., portrait or landscape) of the external device 200.

It should be appreciated that the external device 200 illustrated in FIG. 5 is only one example of a multifunction device, and that the external device 200 optionally has more or fewer components than shown, optionally combines two or more components, or optionally has a different configuration or arrangement of the components. The various components shown in FIG. 5 are implemented in hardware, software, firmware, or a combination thereof, including one or more signal processing and/or application specific integrated circuits.

Memory 528 optionally includes high-speed random access memory and optionally also includes non-volatile memory, such as one or more magnetic disk storage devices, flash memory devices, or other non-volatile solid-state memory devices. Access to memory 528 by other components of the external device 200, such as CPU(s) 536 is, optionally, controlled by memory controller 530.

Peripherals interface 562 can be used to couple input and output peripherals of the device, such as attachment device 100, to CPU(s) 536 and memory 528. The one or more processors 536 run or execute various software programs and/or sets of instructions stored in memory 528 to perform various functions for the external device 200 and to process data.

In some embodiments, the peripherals interface 562, CPU(s) 536, and memory controller 530 are, optionally, implemented on a single chip. In some other embodiments, they are, optionally, implemented on separate chips.

In some embodiments, the RF (radio frequency) circuitry of the network interface 546 receives and sends RF signals, also called electromagnetic signals. The RF circuitry 546 converts electrical signals to/from electromagnetic signals and communicates with communications networks and other devices, such as attachment device 100 in some embodiments, via the electromagnetic signals. The RF circuitry 546 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 546 optionally communicates with networks 532. In some embodiments, circuitry 546 does not include RF circuitry and, in fact, is connected to network 532 through one or more hard wires (e.g., an optical cable, a coaxial cable, or the like).

Examples of networks 532 include, but are not limited to, the World Wide Web (WWW), an intranet and/or a wireless network, such as a cellular telephone network, a wireless local area network (LAN) and/or a metropolitan area network (MAN), and other devices by wireless communication. Another example of a network includes an 802.11 network, such as an 802.11 hotspot. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.1 in), voice over Internet Protocol (VoIP), Wi-MAX, a protocol for e mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of the present disclosure.

In some embodiments, the audio circuitry 556, speaker 558, and microphone 560 provide an audio interface between a subject and external device 200. The audio circuitry 556 receives audio data from peripherals interface 562, converts the audio data to an electrical signal, and transmits the electrical signal to speaker 558. Speaker 558 converts the electrical signal to human-audible sound waves. Audio circuitry 556 also receives electrical signals converted by microphone 560 from sound waves. Audio circuitry 556 converts the electrical signal to audio data and transmits the audio data to peripherals interface 562 for processing. Audio data is, optionally, retrieved from and/or transmitted to memory 528 and/or RF circuitry 546 by peripherals interface 562.

In some embodiments, power system 538 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

As disclosed above, the external device 200 includes an imager 214. In some embodiments, the imager 214 includes a charge-coupled device (CCD) or complementary metal-oxide semiconductor (CMOS) phototransistors. Imager 214 receives light from first optical window 218 of the attachment device 100 and converts the light to data representing an image. In conjunction with optical detector control module 512 (also called a camera module), imager 214 captures images.

As illustrated in FIG. 5, the external device 200 preferably comprises an operating system 502 that includes procedures for handling various basic system services. Operating system 502 (e.g., iOS, DARWIN, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

In some embodiments, the external device 200 comprises an optional electronic address 504 (a mobile phone number, social media account, or e-mail address) associated with the device.

In some embodiments, the system memory 528 further includes one or more of a file system 506 for controlling access to the various files and data structures described herein, an illumination software control module 508 for controlling the light source(s) described herein, a filter housing control module 510 for controlling the position of the filter housing 204, an optical detector software control module 512 for controlling the imager 214 and reading digital images acquired thereby, a digital image data store 518 for storing digital images acquired by the imager 214, a data processing software module 514 for manipulating an acquired image or set of images, and a hyperspectral/multispectral data cube data store 520 for storing hyperspectral/multispectral data cubes assembled from a plurality of hyperspectral/multispectral data planes (images), and a communication interface software control module 516 for controlling the communication interface (network interface including optional RF circuitry) 546 that connects to another device (e.g., a handheld device, laptop computer, or desktop computer) and/or communication network 532 (e.g., a wide area network such as the Internet).

Figure 6:
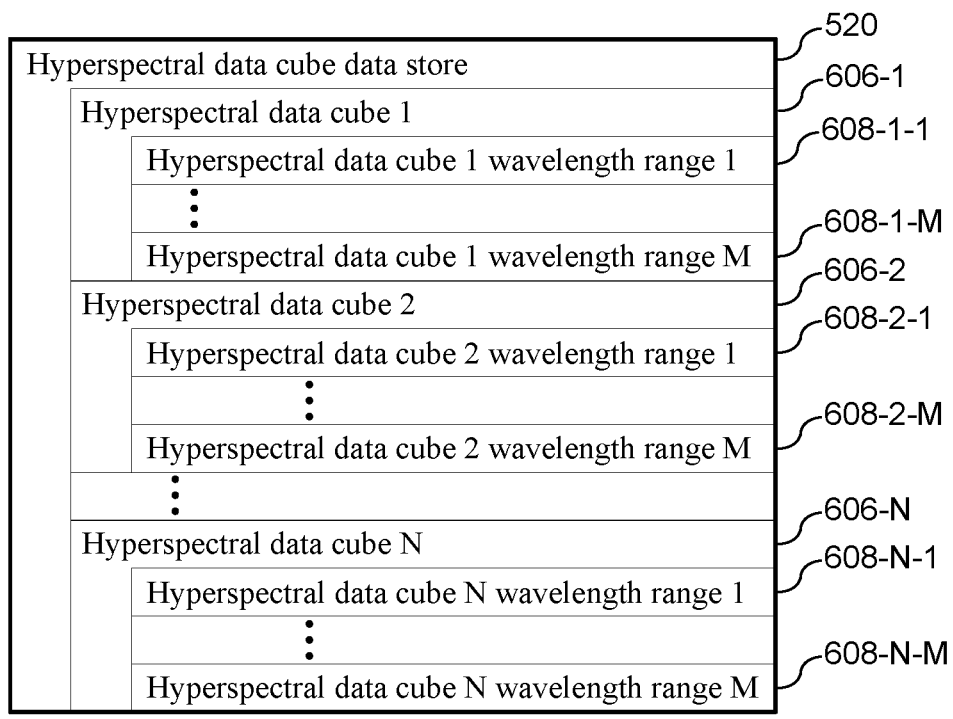
FIG. 6 illustrates a hyperspectral data cube data store that is stored in some external devices in accordance with an embodiment of the present disclosure.

FIG. 6 illustrates with more particularity the hyperspectral/multispectral data cubes that are built, in some embodiments, from filter images acquired by imager 214 in accordance with a hyperspectral/multispectral imaging regimen. In some embodiments, the hyperspectral/multispectral imaging regimen specifies how many still images are to be acquired using imager 214 of the same region of interest 104 of a subject and which filters 304 are to be used when taking these images. Moreover, in some embodiments, the hyperspectral/multispectral imaging regimen specifies a length of exposure for each such image. As illustrated in FIG. 6, the hyperspectral data cube data store 520 stores one or more hyperspectral data cubes 606, with each such data cube 606 comprising a plurality of data planes (images) 608. Each respective data plane (e.g., still image) is acquired at a unique wavelength range that corresponds to the filter 304 in the position of the first optical path 230 in the attachment device 100 when the image for the respective data plane was acquired by the imager 214. In some embodiments a data cube 606 comprises 4 such data planes 608, 5 such data planes 608, 6 such data planes 608, 7 such data planes 608, 8 such data planes 608, 9 such data planes 608, 10 such data planes 608, 11 such data planes 608, or 12 such data planes 608. In some embodiments, each such data plane 608 has a unique wavelength range. In some embodiments, each such data plane 608 has a FWHM bandwidth of 20 nm and the data cube 606 collectively covers from 400 nm to 800 nm. In some embodiments, each such data plane 608 represents a narrow spectral band collected over a discontinuous spectral range. In some embodiments, each such data plane 608 has a narrow spectral band (having a FWHM bandwidth of between 10 nm and 30 nm, between 5 nm and 15 nm, between 5 nm and 50 nm, less than 100 nm, between 1 and 100 nm, etc.), whether collected over a continuous or discontinuous spectral range.

In some embodiments, with reference to FIGS. 2, 5, 6, and 8, one or more software modules installed in memory 528 of the external device individually or collectively perform a hyperspectral/multispectral imaging regimen comprising in which motor step function instructions that instruct the motor 206 to move a filter housing (e.g., 204) in a casing to a first position. The filter housing comprises a plurality of filters 304, the first position causes a first filter 304-1 in the plurality of filters to selectively intercept a first optical path 230 through a casing housing the plurality of filters. The first filter 304-1 is transparent to a first wavelength range and opaque to other wavelengths in at least the visible spectrum. The hyperspectral/multispectral imaging regimen further instructs the light source 216 to power on. The hyperspectral/multispectral imaging regimen further instructs the imager 214 to acquire a first image 608-1-1 of light passing through the first optical path 230 when the filter housing is in the first position. The hyperspectral/multispectral imaging regimen further provides motor step function instructions that instruct the motor 206 to move the filter wheel 204/804 to a second position, after the first image 608-1-1 is acquired. The second position causes a second filter 304-2 in the plurality of filters 304 to selectively intercept the first optical path 230. The second filter 304-2 is transparent to a second wavelength range and opaque to other wavelengths in at least the visible spectrum. The first wavelength range is other than the second wavelength range. The hyperspectral/multispectral imaging regimen further instructs the imager 214 to acquire a second image 608-1-2 of light passing through the first optical path 230 when the filter housing 304 is in the second position. In some embodiments, the hyperspectral/multispectral imaging regimen further instructs the filter housing 304 to move to other positions and for other images 608 at other wavelengths to be acquired. In some embodiments, the hyperspectral/multispectral imaging regimen combines at least the first image 608-1-1 and the second image 608-1-2 to form a hyperspectral/multispectral image 606-1.

In some embodiments, the plurality of filters 304 comprises at least one bandpass filter. In some embodiments, the plurality of filters comprises at least one longpass filter or at least one shortpass filter. In some embodiments, the motor step functions are communicated wirelessly in accordance with a transmission protocol (e.g., Bluetooth, ZigBee, or 802.11). For instance, in some embodiments the motor step functions are communicated from the external device 200 to the attachment device 100 using the network interface 546.

In some embodiments, the hyperspectral/multispectral imaging regimen further comprises displaying the first image 608-1-1, the second image 608-1-1 or the hyperspectral/multispectral image 606, for instance on a display associated with the external device 200. In some embodiments, the first filter 304-1 and the second 304-2 filter are characterized by corresponding first and second central wavelengths, and the first and second central wavelengths are separated by at least 10 nm or by at least 25 nm. In some embodiments, the first filter is a shortpass filter and the second filter is a longpass filter. In some embodiments, the first and second filters are characterized by corresponding first and second central wavelengths, and the first and second central wavelengths are separated by at least 50 nm, or by at least 100 nm.

In some embodiments, the instructions to power the light source 216 on the external device 200 instruct the light source 216 to power on for no longer than one second, for no longer than 500 milliseconds, or for no longer than 250 milliseconds.

In some embodiments, the plurality of filters 304 comprises four or more bandpass filters with each bandpass filter in the four or more bandpass filters characterized by a different central wavelength. In some embodiments, the plurality of filters 304 comprises six or more bandpass filters with each bandpass filter in the six or more bandpass filters characterized by a different central wavelength. In some embodiments, the plurality of filters 304 comprises eight or more bandpass filters, with each bandpass filter in the eight or more bandpass filters characterized by a different central wavelength.

In some embodiments, the first wavelength range is 40 nm or less and the second wavelength range is 40 nm or less. In some embodiments, the first wavelength range is 20 nm or less and the second wavelength range is 20 nm or less. In some embodiments, the first wavelength range is 10 nm or less and the second wavelength range is 10 nm or less.

In some embodiments, as illustrated in FIGS. 2 and 3, the filter housing 204 comprises a filter wheel, and the motor 206 drives the filter wheel about an axis 302 (FIG. 3) to thereby selectively intercept the first optical path 230 with a predetermined one of the filters 304 in the plurality of filters. In alternative embodiments, referring to FIG. 8, the filter housing 804 comprises a filter strip and the motor 206 drives the filter strip along an axis to thereby selectively intercept the first optical path with a predetermined one of the filters in the plurality of filters.

Figure 7:
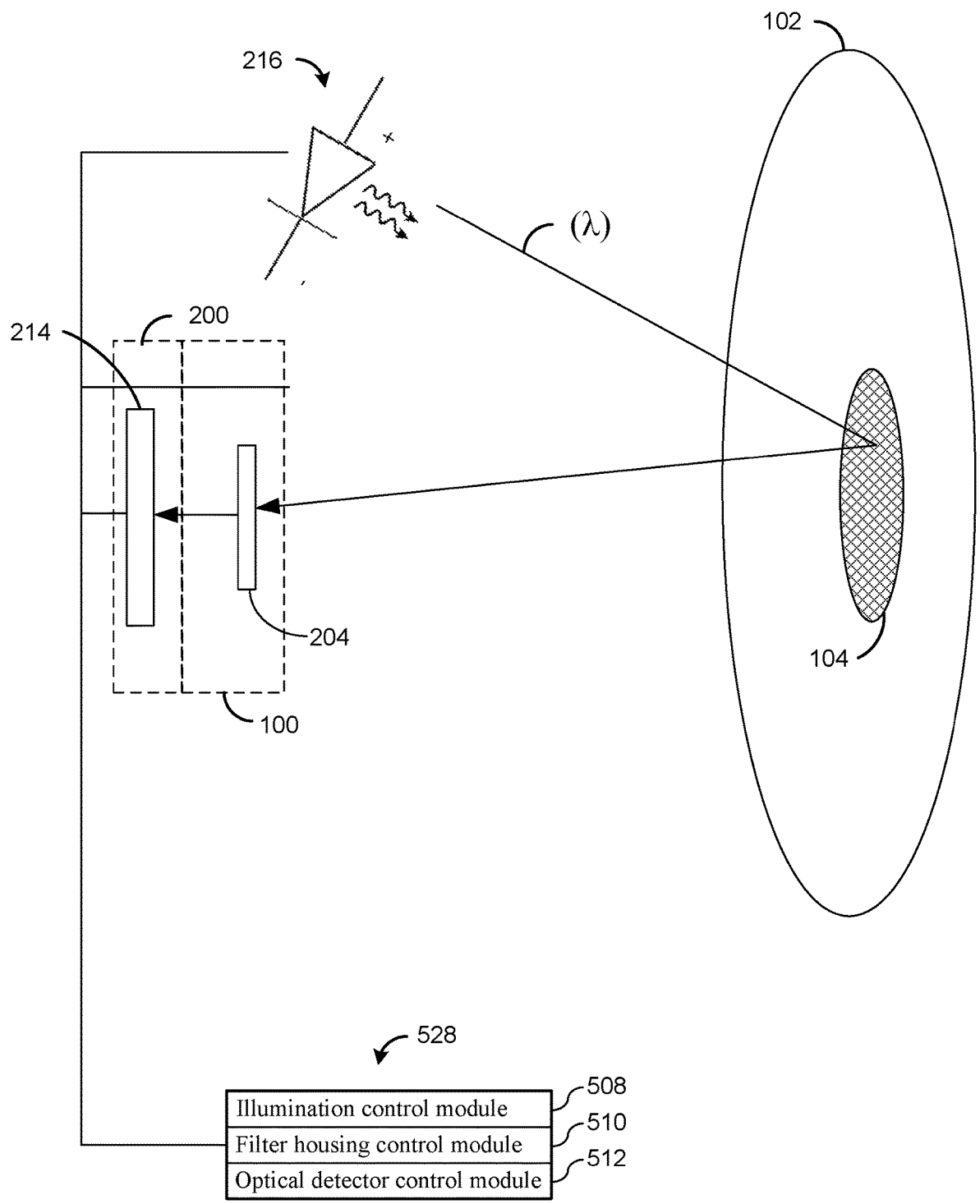
FIG. 7 details the spatial and logical relationship between the attachment device for imaging discrete wavelength bands of a region of interest of a subject and the region of interest of the subject, in accordance with an embodiment of the present disclosure.

FIG. 7 details the spatial and logical relationship between the attachment device 100 and the external device 200 for imaging discrete wavelength bands of a region of interest 104 of a subject 102 and the region of interest of the subject itself, in accordance with an embodiment of the present disclosure. The software modules installed in the memory 528 of the external device 200 individually or collectively perform the above-described hyperspectral/multispectral imaging regimens. In the embodiment illustrated in FIG. 7, it is the illumination control module 508 that controls the light 206, the filter housing control module 510 that sends the motor step functions (e.g., by network interface 546 and/or through direct cable connection) direct the filter housing 204 of the attachment device 100 to move into position, and the optical detector control module 512 that directs the external device 200 to acquire images 608 (FIG. 6) using the imager 214 of the external device 200 in accordance with the hyperspectral/multispectral imaging regimen. In FIG. 7, in typical embodiments the light 216 is a component of the external device 200. In some embodiments, the light is integrated into the casing of the external device 200, such as is found in typical smart phones. In some embodiments, the light 216 is not integrated into the casing of the external device 200. For instance, in some embodiments the light 216 is an attachment to the external device 200. In some such embodiments, the light 216 may include a plurality of wavelength specific diodes that are matched to individual filters 304, such that a diode in the plurality of diodes illuminates the region of interest when a corresponding filter 304 in the plurality of filters is in the first light path 230.

The acquired digital images 608 and hyperspectral/multispectral data cubes 606 can be stored in a storage module (e.g., hyperspectral data cube data store 520) in the system memory 528, and do not need to be concurrently present, depending on which stages of the analysis the data processing module 514 has performed. In fact, in some embodiments, prior to imaging a subject 102 and after communicating acquired digital images 608 or processed data files thereof, the external device 200 contains neither acquired digital images 608 nor hyperspectral data cubes 606. In other embodiments, after imaging a subject 102 and after communicating acquired digital images 608 or processed data files thereof, the external device 200 retains acquired digital images 608 and/or hyperspectral data cubes 606 for a period of time (e.g., until storage space is needed, for a predetermined amount of time, etc.).

In some embodiments, the programs or software modules identified above correspond to sets of instructions for performing a function described above. The sets of instructions can be executed by one or more processors, e.g., a CPU(s) 536. The above identified software modules or programs (e.g., sets of instructions) need not be implemented as separate software programs, procedures, or modules, and thus various subsets of these programs or modules may be combined or otherwise re-arranged in various embodiments. In some embodiments, the memory 528 stores a subset of the modules and data structures identified above. Furthermore, the memory 528 may store additional modules and data structures not described above.

The system memory 528 optionally also includes one or more of the following software modules, which are not illustrated in FIG. 5: a spectral library which includes profiles for a plurality of medical conditions, a spectral analyzer software module to compare measured hyperspectral/multispectral data to a spectral library, control modules for additional sensors, information acquired by one or more additional sensors, an image constructor software module for generating a hyperspectral/multispectral image, a hyperspectral/multispectral image assembled based on a hyperspectral/multispectral data cube and optionally fused with information acquired by an additional sensor, a fusion software control module for integrating data acquired by an additional sensor into a hyperspectral/multispectral data cube, and a display software control module for controlling a built-in display.

While examining a subject and/or viewing hyperspectral/multispectral images of the subject, a physician can optionally provide input that modifies one or more parameters upon which a hyperspectral/multispectral imaging regimen is based. In some embodiments, this input is provided using user interface 540. Among other things, the external device 200 can be instructed to modify the spectral portion selected by a spectral analyzer (e.g., to modify a threshold of analytical sensitivity) or to modify the appearance of the image generated by an image constructor (e.g., to switch from an intensity map to a topological rendering).

Likewise, the external device 200 can be instructed to communicate instructions to the imager 214 to modify the sensing properties (e.g., an exposure setting, a frame rate, an integration rate). Other parameters can also be modified. For example, the external device 200 can be instructed to obtain a wide-view image of the subject for screening purposes, or to obtain a close-in image of a particular region of interest.

Figure 14:
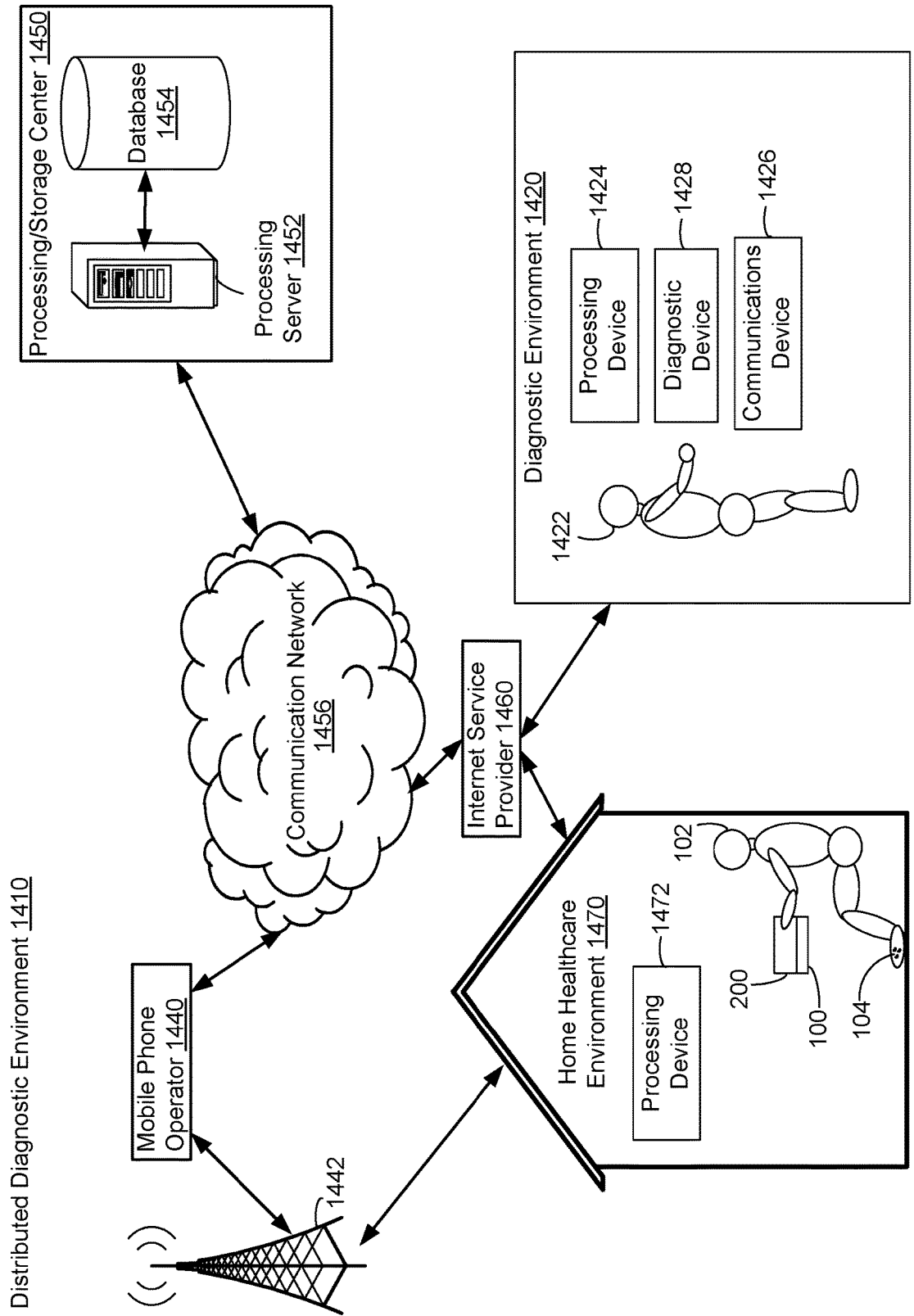
FIG. 14 illustrates a distributed diagnostic environment including an attachment device, attached to an external device, for imaging discrete wavelength bands of a region of interest of a subject in accordance with an embodiment of the present disclosure.

FIG. 14 is an example of a distributed diagnostic environment 1410 including an attachment device 100 and the external device 200 for screening and/or monitoring a medical condition at a location other than a traditional clinical environment (e.g., a doctor's office or hospital), in accordance with some embodiments of the present disclosure. In some embodiments, the distributed diagnostic environment allows a subject 102 to screen for and/or monitor a medical condition at home, eliminating the need to visit a clinical environment. This is advantageous because it greatly reduces the time and cost associated with screening and monitoring. The subject does not have to travel to a clinical environment and does not incur the costs of being attended to by a medical professional. This will improve patient compliance with assigned screening and/or monitoring regimens (e.g., for subjects at risk for a particular medical condition). This will also facilitate more frequent screening and/or monitoring. In this fashion, potentially serious medical conditions can be identified and treated earlier, improving the outcome for the subject.

In some implementations, the distributed diagnostic environment 1410 includes one or more home healthcare environments 1470, one or more diagnostic environments 1420, one or more processing and/or storage centers 1450, and a communication network 1456 that, together with one or more Internet Service Providers 1460 and/or mobile phone operators 1440, with concomitant cell towers 1442, allow communication between the home healthcare environments 1470, the diagnostic environments, and/or the processing/storage centers 1450.

In some embodiments, a subject 102 operates the external device 200 (e.g., a personal smart phone, tablet computer, etc.) attached to an attachment device 100 to acquire a series of images of a region of interest 104, which are combined to form a hyperspectral/multispectral image. The resulting hyperspectral/multispectral image of the region of interest is then processed to identify potential medical conditions that merit further investigation. When such a condition is identified, a medical professional 1422 is alerted of the potential medical condition, and can determine whether to intervene with the subject 102 for further diagnostic evaluation and/or treatment.

In some embodiments, after acquiring the series of images, the external device 200 transmits imaging data (e.g., a hyperspectral/multispectral image data set) to a processing and/or storage center 1450, including a processing server 1452 and database 1454, which forms a processed hyperspectral image. In other embodiments, the external device 200 and/or a processing device 1472 within the home healthcare environment forms the processed hyperspectral image using the hyperspectral/multispectral image data set, and transmits the processed hyperspectral image to the processing and/or storage center 1450 and/or directly to a diagnostic environment 1420, where it is accessible by a medical professional 1422 via diagnostic device 1428. In some embodiments, a processed hyperspectral image stored in processing and/or storage center 1450 is accessible to a medical professional 1422 in a diagnostic environment via communications device 1426. In yet other embodiments, the external device 200 transmits imaging data directly to the diagnostic environment, where it is processed by processing device 1424 and accessible to a medical professional via diagnostic device 1428.

In some implementations, the medical professional 1422, after reviewing the processed hyperspectral image, and/or an indication of a medical condition generated from the processed hyperspectral image, contacts the individual for further diagnostic evaluation (e.g., using a more sensitive hyperspectral/multispectral imaging device) and treatment within a clinical environment (e.g., a doctor's office or hospital). In some embodiments, the processed hyperspectral image, and/or an indication of a medical condition generated from the hyperspectral image, is presented to the medical professional 1422 only if there is an abnormality or progression of a medical condition. As such, in some embodiments, the attachment device 100 is used in conjunction with an external device 200 to provide inexpensive and quick diagnostic assessments of a subject at home.

Exemplary methods. FIGS. 10 through 13 collectively illustrate a flow chart of methods for imaging discrete wavelength bands using a device in accordance with an embodiment of the present disclosure. In the flowchart, preferred parts of the methods are shown in solid line boxes whereas optional variants of the methods, or optional equipment used by the methods, are shown in dashed line boxes. As such, FIGS. 10-13 illustrate methods for performing a hyperspectral/multispectral imaging regimen. The methods are performed at a device (e.g., external device 200) comprising one or more processors 536, memory 528 storing one or more programs for execution by the one or more processors, a light source 216, a communications interface, and a two-dimensional imager (e.g., imager 214). The external device 200 is attached to an attachment device 100. The one or more programs singularly or collectively execute the method (1002).

In some embodiments, the two-dimensional imager 214 is a charge-coupled device (CCD), a complementary metal-oxide-semiconductor (CMOS), a photo-cell, or a focal plane array (1004). In some embodiments, the external device 200 is a smart phone, a personal digital assistant (PDA), an enterprise digital assistant, a tablet computer, or a digital camera (1006). In some embodiments, the attachment device has a maximum power consumption of less than 15 watts, less than 10 watts, or less than 5 watts (1008). As such, advantageously, in some embodiments a source of power 210 for the attachment device 100 is a battery (e.g., a rechargeable battery) (1010).

In accordance with the method, the one or more programs singularly or collectively communicate from the external device 200 to the attachment device 100, through the communications interface, motor step function instructions that instruct the motor 206 of the attachment device 100 to move a filter housing 204 (FIG. 2)/804 (FIG. 8) of the attachment device in a casing of the attachment device to a first position. The filter housing 204/804 comprises a plurality of filters 304. The first position of the filter housing 204/804 causes a first filter 304-1 in the plurality of filters to selectively intercept a first optical path 230 through the filter housing. The first filter 304-1 is transparent to a first wavelength range and opaque to other wavelengths in at least the visible spectrum (1012).

In some embodiments, the plurality of filters comprises at least one bandpass filter (1014). In some embodiments, the plurality of filters comprises at least one longpass filter (1016). In some embodiments, the plurality of filters comprises at least one shortpass filter (1018). In some embodiments, the communication interface of the external device 200 comprises a wireless signal transmission element (e.g., network interface including RF circuitry 546 of FIG. 5) and the motor step function instructions are sent by the wireless signal transmission element (1020). In some such embodiments, the wireless signal transmission element is a Bluetooth transmission element, a ZigBee transmission element, or a Wi-Fi transmission element (1022).

In some embodiments, the plurality of filters 304 comprises four or more bandpass filters, and each bandpass filter in the four or more bandpass filters is characterized by a different central wavelength (1024). In some embodiments, the plurality of filters 304 comprises six or more bandpass filters, and each bandpass filter in the six or more bandpass filters is characterized by a different central wavelength (1026). In some embodiments, the plurality of filters 304 comprises eight or more bandpass filters, and each bandpass filter in the eight or more bandpass filters is characterized by a different central wavelength (1028).

In some embodiments, the filter housing comprises a filter wheel 204 (e.g., element 204 of FIGS. 2 and 3), and the motor 206 drives the filter wheel about an axis 302 to thereby selectively intercept the first optical path 230 with a predetermined one of the filters in the plurality of filters (1030). In other embodiments, the filter housing comprises a filter strip 804 (e.g., element 804 with reference to FIGS. 8 and 9), and the motor 206 drives the filter strip 804 along an axis 806 to thereby selectively intercept the first optical path 230 with a predetermined one of the filters 304 in the plurality of filters (1032).

In accordance with the method, the one or more programs singularly or collectively instruct the light source 216 to power on (1034). In some embodiments, instructing the light source to power on instructs the light source to power on for no longer than one second, no longer than 500 milliseconds, or no longer than 250 milliseconds (1036). In some embodiments (not shown in FIG. 2 or 8) the light source is in electrical communication with the external device 200 but is not integral to the external device 200. In some such embodiments the light source comprises a plurality of LEDs, and each such LED is characterized by a wavelength band that is similar to or identical (e.g., matched) to a corresponding filter in the plurality of filters. Accordingly, in some such embodiments, one or a subset of the plurality of LEDs are powered on when the filter 304 corresponding to the one or the subset of the plurality of LEDs is moved into the first optical path 230.

In accordance with the method, the one or more programs singularly or collectively instruct the two-dimensional imager 214 to acquire a first image 608-1-1 of light passing through the first optical path 230 when the filter housing 204/804 is in the first position (1038). In accordance with the method, the one or more programs singularly or collectively then communicate, through the communications interface, motor step function instructions that instruct the motor 206 to move the filter housing 204/804 to a second position, after the first image 608-1-1 is acquired, where the second position causes a second filter 304-2 in the plurality of filters to selectively intercept the first optical path 320. Here, the second filter 304-2 is transparent to a second wavelength range and opaque to other wavelengths in at least the visible spectrum, and the first wavelength range is other than the second wavelength range (1040).

In some such embodiments, the communications interface comprises a first communications interface, and the external device 200 attaches to the attachment device 100 thereby bringing the first communications interface in direct physical and electrical communication with a second communications interface of the attachment device 100 thereby enabling instructions to be sent directly to the second communications interface from the first communications interface in accordance with the communicating (1042).

In some such embodiments, the communications interface comprises a first communications interface, and attachment of the external device 200 to the attachment device 100 brings the first communications interface in direct physical and electrical communication with a second communications interface of the attachment device thereby enabling the motor step function instructions to be sent directly to the second communications interface from the first communications interface in accordance with the communicating. Furthermore, a source of power of the attachment device 100 is a battery, and the battery is recharged through the first communications interface by electrical power obtained from the second communications interface of the external device (1044).

In accordance with the method, the one or more programs singularly or collectively instruct the two-dimensional imager 214 to acquire a second image of light 608-1-2 passing through the first optical path 320 when the filter housing 204/804 is in the second position (1046).

In some embodiments, the first 304-1 and second filters 304-2 are characterized by corresponding first and second central wavelengths, and the first and second central wavelengths are separated by at least 10 nm or at least 25 (1048). In some embodiments, the first wavelength range is 40 nm or less and the second wavelength range is 40 nm or less (1050).

In some embodiments, the first wavelength range is 20 nm or less and the second wavelength range is 20 nm or less (1052). In some embodiments, the first wavelength range is 10 nm or less and the second wavelength range is 10 nm or less (1054). In some embodiments, the first filter is a shortpass filter and the second filter is a longpass filter (1056). In some embodiments, the first and second filters are characterized by corresponding first and second central wavelengths, and the first and second central wavelengths are separated by at least 50 nm, or by at least 100 nm (1058). In some embodiments, the first image 608-1-2 and the second image 608-1-2 are used to form a corresponding hyperspectral data cube 606-1.

In some embodiments, the external device 200 further comprises a display 1304 (e.g., see FIG. 1), and the method further comprises displaying the first image 608-1-1, the second image 608-1-2, or the resulting hyperspectral/multispectral image 606-1 on the display (1060). In some embodiments, the display is a touch screen display and the displayed image is enlargeable or reducible by human touch to the touch screen (1062). In some embodiments, the display is configured for focusing an image of a surface of a subject acquired by the two-dimensional imager 214 (1064).

Spectral Analyzer. In some embodiments, the memory 528 include a spectral library and spectral analyzer for comparing hyperspectral/multispectral data 608 acquired by the external device 200 to known spectral patterns associated with various medical conditions. In other embodiments, analysis of the acquired hyperspectral/multispectral data 608 is performed on another devices such as a handheld device, tablet computer, laptop computer, desktop computer, an external server, for example in a cloud computing environment.

In some embodiments, a spectral library includes profiles for a plurality of medical conditions, each of which contain a set of spectral characteristics unique to the medical condition. A spectral analyzer uses the spectral characteristics to determine the probability or likelihood that a region of the subject corresponding to a measured hyperspectral/multispectral data cube 608 is inflicted with the medical condition. In some embodiments, each profile includes additional information about the condition, e.g., information about whether the condition is malignant or benign, options for treatment, etc. In some embodiments, each profile includes biological information, e.g., information that is used to modify the detection conditions for subjects of different skin types. In some embodiments, the spectral library is stored in a single database. In other embodiments, such data is instead stored in a plurality of databases that may or may not all be hosted by the same computer, e.g., on two or more computers addressable by wide area network. In some embodiments, the spectral library is electronically stored in a non-volatile storage unit and recalled using memory controller 530 when needed.

In some embodiments, a spectral analyzer analyzes a particular spectra derived from a hyperspectral/multispectral data cube 608, the spectra having pre-defined spectral ranges (e.g., spectral ranges specific for a particular medical condition), by comparing the spectral characteristics of a pre-determined medical condition to the subject's spectra within the defined spectral ranges. Performing such a comparison only within defined spectral ranges can both improve the accuracy of the characterization and reduce the computational power needed to perform such a characterization.

The spectral characteristics of a medical condition, such as ischemia or an ulcer, can be determined, for example, by first identifying an actual condition of that type on another subject, for example using conventional visual examination, and then obtaining the wavelength-dependent backscattering $R_{MC}(\lambda)$ of a representative region of the skin affected by the medical condition. The backscattering of the affected skin $R_{MC}(\lambda)$ can then be spectrally compared to the wavelength-dependent backscattering of that subject's normal skin in the same area of the lesion, $R_{NS}(\lambda)$, by normalizing the backscattering of the affected skin against the backscattering of normal skin as follows:

$$R_{MC,N}(\lambda) R_{MC}(\lambda)/R_{NS}(\lambda)$$

where $R_{MC,N}(\lambda)$ is the normalized backscattering of the affected skin. In other embodiments, $R_{MC,N}(\lambda)$ is instead determined by taking the difference between $R_{MC}(\lambda)$ and $R_{NS}(\lambda)$, or by calculating $R_{MC,N}(\lambda)=[R_{MC}(\lambda)-R_{NS}(\lambda)]/[R_{MC}(\lambda)+R_{NS}(\lambda)]$. Other types of normalization are possible. Note that if there are multiple representative regions of affected skin, there will be as many normalized backscatterings of the affected skin. These normalized backscatterings can be averaged together, thus accounting for the natural spectral variation among different regions of the affected skin. Note also that because of the natural variation in characteristics of normal skin among individuals, as well the potential variation in characteristics of a particular type of affected skin among individuals, it can be useful to base the model of the normalized affected skin backscattering $R_{MC,N}(\lambda)$ on the average of the backscatterings $R_{MC}(\lambda)$ of many different affected skin samples of the same type, as well as on the average of the backscatterings $R_{NS}(\lambda)$ of many different types of normal skin (e.g., by obtaining $R_{MC,N}(\lambda)$ for many different subjects having that medical condition, and averaging the results across the different subjects).

In one embodiment, in order to determine whether the subject has the type of medical condition characterized by $R_{MC,N}(\lambda)$, the spectral analyzer obtains the skin reflectance of each region, $R_{region}(\lambda)$, from a measured hyperspectral cube 606 or data plane 608. The spectral analyzer then normalizes the backscattering $R_{region}(\lambda)$ from that region against the wavelength-dependent backscattering of the subject's normal skin in the same area, $R_{NS, Subject}(\lambda)$, as follows:

$$R_{region,N}(\lambda)=R_{region}(\lambda)/R_{NS,Subject}(\lambda),$$

where $R_{region,N}(\lambda)$ is the normalized backscattering of the region. Other types of normalization are possible.

In some embodiments, the spectral analyzer analyzes the subjects' spectra by comparing $R_{region,N}(\lambda)$ to $R_{MC,N}(\lambda)$. In one simple example, the comparison is done by taking the ratio $R_{region,N}(\lambda)/R_{MC,N}(\lambda)$, or the difference $R_{MC,N}(\lambda)-R_{region,N}(\lambda)$. The magnitude of the ratio or difference indicates whether any region has spectral characteristics that match that of affected skin. However, while ratios and differences are simple calculations, the result of such a calculation is complex and requires further analysis before a diagnosis can be made. Specifically, the ratio or subtraction of two spectra, each of which has many peaks, generates a calculated spectrum that also has many peaks. Some peaks in the calculated spectrum may be particularly strong (e.g., if the subject has the medical condition characterized by $R_{MC,N}(\lambda)$), but other peaks may also be present (e.g., due to noise, or due to some particular characteristic of the subject). A physician in the examination room would typically find significantly more utility in a simple "yes/no" answer as to whether the subject has a medical condition, than he would in a complex spectrum. One method of obtaining a "yes/no" answer is to calculate whether a peak in the calculated spectrum has a magnitude that is above or below a predetermined threshold and is present at a wavelength that would be expected for that medical condition.

Another way to obtain a "yes/no" answer is to treat $R_{region,N}(\lambda)$ and $R_{MC,N}(\lambda)$ as vectors, and to determine the "angle" between the vectors. The angle represents the degree of overlap between the vectors, and thus represents how likely it is that the subject has the medical condition. If the angle is smaller than a threshold value, the subject is deemed to have the medical condition; if the angle does not exceed a threshold value, the subject is deemed not to have the medical condition. Alternately, based on the value of the angle between the vectors, a probability that the subject has the medical condition can be determined.

In one embodiment, a spectral library may comprise a personalized database of spectral information that is collected for a particular subject. The personalized database can then be used to monitor changes in the subject over time. Changes over time in the spectral characteristics of a region on the subject can be used to provide information, for example, on the progression or regression of a medical condition, the efficacy of treatment, and the appearance of a new medical condition (e.g., the formation of an ulcer). The provided information can be used to inform the medical treatment of the subject. For further details, see U.S. Patent Publication No. 2009/0326383, the content of which is hereby incorporated herein by reference in its entirety for all purposes.

In certain embodiments, the spectral analyzer includes a trained data analysis algorithm for identifying a region on the subject's skin of biological interest using an image obtained by the apparatus and/or for determining a portion of a hyperspectral/multispectral data cube that contains information about a biological insult in the subject's skin. A wide variety of pattern classification techniques and/or statistical techniques can be used in accordance with the present disclosure to help in the analysis. For instance, such pattern classification techniques and/or statistical techniques can be used to (i) assist in identifying a medical condition of a subject, (ii) assist in characterizing a medical condition of a subject, and (iii) assist in analyzing the progression of a medical condition of a subject (e.g., detect changes in tissue composition or a wound on the skin of a patient over time). For further details, see U.S. Patent Publication No. 2009/0326383, the content of which is hereby incorporated herein by reference in its entirety for all purposes.

Pattern classification is used to mine a spectral library to identify and characterize medical conditions (e.g., ischemia, an ulcer, diabetes, etc.) that are characterized by observable hyperspectral/multispectral signatures. In some examples, the hyperspectral/multispectral signatures are values of specific pixels in an image of a subject's skin, patterns of values of specific groups of pixels in an image of a subject's skin, values of specific measured wavelengths or any other form of observable data that is directly present in the spectral data and/or that can be derived from the spectral data taken of a subject's skin. In some embodiments, pattern classification techniques such as artificial intelligence are used to analyze hyperspectral/multispectral data cubes, the output of other sensors or cameras, and/or hyperspectral/multispectral images themselves (which may or may not be fused with other information). further details, see: U.S. Patent Publication No. 2009/0326383; National Research Council; Panel on Discriminant Analysis Classification and Clustering, Discriminant Analysis and Clustering, Washington, D.C.: National Academy Press; and Dudoit et al., JASA 97; 77-87 (2002), the contents of which are hereby incorporated herein by reference in their entireties, for all purposes.

Relevant algorithms for decision rules include, but are not limited to: discriminant analysis including linear, logistic, and more flexible discrimination techniques (see, e.g., Gnanadesikan, 1977, *Methods for Statistical Data Analysis of Multivariate Observations*, New York: Wiley 1977; tree-based algorithms such as classification and regression trees (CART) and variants (see, e.g., Breiman, 1984, *Classification and Regression Trees*, Belmont, Calif.: Wadsworth International Group); generalized additive models (see, e.g., Tibshirani, 1990, *Generalized Additive Models*, London: Chapman and Hall); neural networks (see, e.g., Neal, 1996, *Bayesian Learning for Neural Networks*, New York: Springer-Verlag; and Insua, 1998, Feedforward neural networks for nonparametric regression In: *Practical Nonparametric and Semiparametric Bayesian Statistics*, pp. 181-194, New York: Springer), the contents of which are hereby incorporated herein by reference in their entireties, for all purposes. Other suitable data analysis algorithms for decision rules include, but are not limited to, logistic regression, or a nonparametric algorithm that detects differences in the distribution of feature values (e.g., a Wilcoxon Signed Rank Test (unadjusted and adjusted)).

Additional suitable data analysis algorithms are known in the art, some of which are reviewed in Hastie et al., (2001, The Elements of Statistical Learning, Springer-Verlag, New York, Chapter 9, the content of which is hereby incorporated herein by reference in its entirety for all purposes). Examples of data analysis algorithms include, but are not limited to: Classification and Regression Tree (CART), Multiple Additive Regression Tree (MART), Prediction Analysis for Microarrays (PAM), and Random Forest analysis. Such algorithms classify complex spectra and/or other information in order to distinguish subjects as normal or as having a particular medical condition. Other examples of data analysis algorithms include, but are not limited to, ANOVA and nonparametric equivalents, linear discriminant analysis, logistic regression analysis, nearest neighbor classifier analysis, neural networks, principal component analysis, quadratic discriminant analysis, regression classifiers and support vector machines. Such algorithms may be used to construct a decision rule and/or increase the speed and efficiency of the application of the decision rule and to avoid investigator bias, one of ordinary skill in the art will realize that computer-based algorithms are not required to carry out the disclosed methods.

In specific embodiments, suitable data analysis algorithms operable by the central processing unit(s) 536 of the external device 200 described herein, or by other devices or servers, are used, for example, to detect the location and/or severity of diabetic foot ulcers or pressure ulcers. In some embodiments, suitable data analysis algorithms are used to predict the possible formation of diabetic foot ulcers or pressure ulcers. Non-limiting examples of suitable data analysis algorithms for these purposes are found in Yudovsky D. et al., J Diabetes Sci Technol. 2010 Sep. 1; 4(5): 1099-113; Yudovsky D. et al., J Biomed Opt. (2011) February; 16(2): 026009, and Yudovsky D. et al., J Biophotonics (2011) August; 4(7-8):565-76, the contents of which are hereby incorporated herein by reference in their entireties for all purposes.

For additional information on the use of trained data analysis algorithms for the analysis of hyperspectral/multispectral data, see, for example, U.S. Patent Publication Nos. 2009/0326383 and 2003/0215791, and U.S. Pat. Nos. 7,282, 723 and 7,219,086, the contents of which are hereby incorporated herein by reference herein in their entireties for all purposes.

Display Subsystem. Referring to FIG. 1, in certain embodiments, the external device comprises a display 1304 which receives an image (e.g., a color image, mono-wavelength image, or hyperspectral/multispectral image 606) from a display control module, and displays the image. Optionally, the display subsystem also displays a legend that contains additional information. For example, the legend can display information indicating the probability that a region has a particular medical condition, a category of the condition, a probable age of the condition, the boundary of the condition, information about treatment of the condition, information indicating possible new areas of interest for examination, and/or information indicating possible new information that could be useful to obtain a diagnosis, e.g., another test or another spectral area that could be analyzed.

In one embodiment, as illustrated in FIG. 1, a housing display is built into the housing of the external device 200. In an example of such an embodiment, a video display in electronic communication with the processor 536 is mounted on the back-side of the external device 200 as illustrated. In a particular embodiment, the housing display 1304 is a touchscreen display that is used to manipulate the displayed image and/or control the external device 200 and/or the attachment device 100.

In yet another embodiment, the external device 200 is configured to be in wired or wireless communication with an external display device, for example, on a handheld device, tablet computer, laptop computer, desktop computer, television, IPOD, or projector unit, on which the image is displayed. Optionally, a user interface on the external display device is used to manipulate the displayed image and/or control the hyperspectral/multispectral system.

In one embodiment, an image can be displayed in real time on the display 1304. The real-time image can be used, for example, to focus an image of the subject, to select an appropriate region of interest, and to zoom the image of the subject in or out. In one embodiment, the real-time image of the subject is a color image captured by an optical detector.

In some embodiments, a hyperspectral/multispectral image 608 constructed from data collected by the imaging system is displayed on the display 1304. Assembled hyperspectral/multispectral data (e.g., present in a hyperspectral/ multispectral data cube) is used to create a two-dimensional representation of the imaged object or subject, based on one or more parameters. An image constructor module, (e.g., stored in the external device memory or in the attachment device 100 or other device), constructs an image based on, for example, an analyzed spectra. Specifically, the image constructor creates a representation of information within the spectra. In one example, the image constructor constructs a two-dimensional intensity map in which the spatially-varying intensity of one or more particular wavelengths (or wavelength ranges) within the spectra is represented by a corresponding spatially varying intensity of a visible marker.

In certain embodiments, the image constructor fuses a hyperspectral image 608 with information obtained from one or more additional sensors. Non-limiting examples of suitable image fusion methods include but are not limited to, band overlay, high-pass filtering method, intensity hue-saturation, principle component analysis, and discrete wavelet transform. For further details on exemplary image fusion techniques, see U.S. Patent Publication No. 2009/0326383, the content of which is hereby incorporated herein by reference in its entirety for all purposes.

Touchscreen Displays. In one embodiment, the display 1304 includes a touchscreen video display that can be manipulated by the user, for example, to focus an image, zoom in or out within an image, select a region of an image for further analysis, change the contrast of the image, change a parameter of a hyperspectral/multispectral image (e.g., the mode, spectral bands represented, artificial coloring, etc.). Touchscreens use various technologies to sense touch from a finger or stylus, such as resistive, capacitive, infrared, and acoustic sensors. Resistive sensors rely on touch to cause two resistive elements overlaying the display to contact one another completing a resistive circuit, while capacitive sensors rely on the capacitance of a finger changing the capacitance detected by an array of elements overlaying the display device. Infrared and acoustic touchscreens similarly rely on a finger or stylus to interrupt infrared or acoustic waves across the screen, indicating the presence and position of a touch.

Capacitive and resistive touchscreens often use transparent conductors such as indium tin oxide (ITO) or transparent conductive polymers such as PEDOT to form an array over the display image, so that the display image can be seen through the conductive elements used to sense touch. The size, shape, and pattern of circuitry have an effect on the accuracy of the touchscreen, as well as on the visibility of the circuitry overlaying the display. Although a single layer of most suitable conductive elements is difficult to see when overlaying a display, multiple layers can be visible to a user, and some materials such as fine line metal elements are not transparent but rely on their small size to avoid being seen by users.

For additional information on the use of touchscreen displays, see, for example, U.S. Pat. Nos. 7,190,348, 7,663,607, and 7,843,516 and U.S. Patent Publication Nos. 2008/0062139, 2009/0046070, 2011/0102361, 2011/0095996, the contents of which are hereby incorporated herein by reference in their entireties for all purposes.

Additional Elements. In some embodiments, the external device 200 and coupled attachment device 100 are mountable on a tripod or other fixed structure. In some embodiments, the tripod is a fixed sensor tripod or a fixed sensor tripod on wheels. In some embodiments, the external device 200 and coupled attachment device 100 is mountable on a mobile or fixed rack. For example, in some embodiments, the external device 200 and coupled attachment device 100 is mounted on a rack or other permanent fixture in an examination room.

Overview of Methods. In some embodiments, the disclosed external device 200 and coupled attachment device 100 acquire hyperspectral/multispectral images of a subject, or region of interest (ROI) thereof, at a single time point, to evaluate the subject at that particular point in time. In other embodiments, multiple hyperspectral/multispectral images 606 of a subject, or ROI thereof, are taken over a period of time, for example, separated by a minute, hour, day, week, month, year, or decade, to monitor, for example, the overall health of the subject, progression of a medical condition (e.g., progression of a disease), regression of a medical condition, the efficacy of a treatment plan, or to proactively monitor the subject for a medical condition.

For example, in one embodiment, the feet of a subject diagnosed with diabetes are periodically imaged by the hyperspectral/multispectral techniques and the disclosed external device 200 and coupled attachment device 100 described herein to monitor for initial signs of the formation of a diabetic foot ulcer, which occur in fifteen percent of all diabetic patients (Brem and Tomic-Canic, J Clin Invest. 2007 May; 117(5):1219-22). In varying embodiments, the patient's feet are imaged at least once a week, at least once a month, at least once every three months, at least once every six months, or at least once a year.

Application of Hyperspectral/Multi spectral Medical Imaging. In some embodiments, the present disclosure provides systems and methods for hyperspectral/multispectral medical imaging. These methods are based on distinguishing the different interactions that occur between light at different wavelengths and components of the human body, especially components located in or just under the skin. For example, it is well known that deoxyhemoglobin absorbs a greater amount of light at 700 nm than does water, while water absorbs a much greater amount of light at 1200 nm, as compared to deoxyhemoglobin. By measuring the absorbance of a two-component system consisting of deoxyhemoglobin and water at 700 nm and 1200 nm, the individual contribution of deoxyhemoglobin and water to the absorption of the system, and thus the concentrations of both components, can readily be determined. By extension, the individual components of more complex systems (e.g., human skin) can be determined by measuring the absorption of a plurality of wavelengths of light reflected or backscattered off of the system.

The particular interactions between the various wavelengths of light measured by hyperspectral/multispectral imaging and each individual component of the system (e.g., skin) produces hyperspectral/multispectral signature, when the data is constructed into a hyperspectral/multispectral data cube. Specifically, different regions (e.g., different ROI on a single subject or different ROI from different subjects) interact differently with the light depending on the presence of, for example, a medical condition in the region, the physiological structure of the region, and/or the presence of a chemical in the region. For example, fat, skin, blood, and flesh all interact with various wavelengths of light differently from one another. Similarly, a given type of cancerous lesion interacts with various wavelengths of light differently from normal skin, from non-cancerous lesions, and from other types of cancerous lesions. Likewise, a given chemical that is present (e.g., in the blood, or on the skin) interacts with various wavelengths of light differently from other types of chemicals. Thus, the light obtained from each illuminated region of a subject has a spectral signature based on the characteristics of the region, which signature contains medical information about that region.

For example, the structure of skin, while complex, can be approximated as two separate and structurally different layers, namely the epidermis and dermis. These two layers have very different scattering and absorption properties due to differences of composition. The epidermis is the outer layer of skin. It has specialized cells called melanocytes that produce melanin pigments. Light is primarily absorbed in the epidermis, while scattering in the epidermis is considered negligible. For further details, see G. H. Findlay, "Blue Skin," British Journal of Dermatology 83(1), 127-134 (1970), the content of which is incorporated herein by reference in its entirety for all purposes.

The dermis has a dense collection of collagen fibers and blood vessels, and its optical properties are very different from that of the epidermis. Absorption of light of a bloodless dermis is negligible. However, blood-born pigments like oxy- and deoxy-hemoglobin and water are major absorbers of light in the dermis. Scattering by the collagen fibers and absorption due to chromophores in the dermis determine the depth of penetration of light through skin.

Light used to illuminate the surface of a subject will penetrate into the skin. The extent to which the light penetrates will depend upon the wavelength of the particular radiation. For example, with respect to visible light, the longer the wavelength, the farther the light will penetrate into the skin. For example, only about 32% of 400 nm violet light penetrates into the dermis of human skin, while greater than 85% of 700 nm red light penetrates into the dermis or beyond (see, Capinera J. L., *Encyclopedia of Entomology*, $2^{nd}$ Edition, Springer Science (2008) at page 2854, the content of which is hereby incorporated herein by reference in its entirety for all purposes). For purposes of the present disclosure, when referring to "illuminating a tissue," "reflecting light off of the surface," and the like, it is meant that radiation of a suitable wavelength for detection is backscattered from a tissue of a subject, regardless of the distance into the subject the light travels. For example, certain wavelengths of infra-red radiation penetrate below the surface of the skin, thus illuminating the tissue below the surface of the subject.

Briefly, light from the illuminator(s) on the systems described herein penetrates the subject's superficial tissue and photons scatter in the tissue, bouncing inside the tissue many times. Some photons are absorbed by oxygenated hemoglobin molecules at a known profile across the spectrum of light. Likewise for photons absorbed by de-oxygenated hemoglobin molecules. The images resolved by the optical detectors consist of the photons of light that scatter back through the skin to the lens subsystem. In this fashion, the images represent the light that is not absorbed by the various chromophores in the tissue or lost to scattering within the tissue. In some embodiments, light from the illuminators that does not penetrate the surface of the tissue is eliminated by use of polarizers. Likewise, some photons bounce off the surface of the skin into air, like sunlight reflecting off a lake.

Accordingly, different wavelengths of light may be used to examine different depths of a subject's skin tissue. Generally, high frequency, short-wavelength visible light is useful for investigating elements present in the epidermis, while lower frequency, long-wavelength visible light is useful for investigating both the epidermis and dermis. Furthermore, certain infra-red wavelengths are useful for investigating the epidermis, dermis, and subcutaneous tissues.

In the visible and near-infrared (VNIR) spectral range and at low intensity irradiance, and when thermal effects are negligible, major light-tissue interactions include reflection, refraction, scattering and absorption. For normal collimated incident radiation, the regular reflection of the skin at the air-tissue interface is typically only around 4%-7% in the 250-3000 nanometer (nm) wavelength range. For further details, see R. R. Anderson and J. A. Parrish, "The optics of human skin," Journal of Investigative Dermatology 77(1), 13-19 (1981), the content of which is hereby incorporated by reference in its entirety for all purposes. When neglecting the air-tissue interface reflection and assuming total diffusion of incident light after the stratum corneum layer, the steady state VNIR skin reflectance can be modeled as the light that first survives the absorption of the epidermis, then reflects back toward the epidermis layer due the isotropic scattering in the dermis layer, and then finally emerges out of the skin after going through the epidermis layer again.

Using a two-layer optical model of skin, the overall backscattering can be modeled as:

$$R(\lambda)=T_E^2(\lambda)R_D(\lambda)$$

where $T_E(\lambda)$ is the transmittance of epidermis and $R_D(\lambda)$ is the reflectance of dermis. The transmittance due to the epidermis is squared because the light passes through it twice before emerging out of skin. Assuming the absorption of the epidermis is mainly due to the melanin concentration, the transmittance of the epidermis can be modeled as:

$$T_E(\lambda)=\exp(d_E c_m m(\lambda))$$

where $d_E$ is the depth of the epidermis, cm is the melanin concentration and $m(\lambda)$ is the absorption coefficient function for melanin. For further details, see S. L. Jacques, "Skin optics," Oregon Medical Laser Center News Etc. (1988), the content of which is hereby incorporated herein by reference in its entirety for all purposes. For additional information on modeling reflectance, backscattering, transmittance, absorption, and internal scattering of skin, see, U.S. Patent Application Publication No. 2009/0326383 to Barnes et al., the content of which is hereby incorporated herein by reference in its entirety for all purposes.

The value of a tissue's (e.g., skin) backscattering as a function of wavelength, $R(\lambda)$, can be used to obtain medical information about the tissue and its underlying structures. For example, when skin cancers like basal cell carcinoma (BCC), squamous cell carcinoma (SCC), and malignant melanoma (MM) grow in the skin, the molecular structure of the affected skin changes. Malignant melanoma is a cancer that begins in the melanocytes present in the epidermis layer. For further details, see "Melanoma Skin Cancer," American Cancer Society (2005), the content of which is hereby incorporated herein by reference in its entirety for all purposes. Most melanoma cells produce melanin that in turn changes the backscattering characteristics as a function of wavelength $R(\lambda)$ of the affected skin. Squamous and basal cells are also present in the epidermis layer. The outermost layer of the epidermis is called the stratum corneum. Below it are layers of squamous cells. The lowest part of the epidermis, the basal layer, is formed by basal cells. Both squamous and basal cell carcinomas produce certain viral proteins that interact with the growth-regulating proteins of normal skin cells. The abnormal cell growth then changes the epidermis optical scattering characteristics and consequently the skin backscattering properties as a function of wavelength $R(\lambda)$. Thus, information about different skin conditions (e.g., normal skin, benign skin lesions and skin cancers) can be obtained by characterizing the backscattering $R(\lambda)$ from the tissue.

Accordingly, the systems and methods described herein can be used to diagnose and characterize a wide variety of medical conditions. In one embodiment, the concentration of one or more skin or blood component is determined in order to evaluate a medical condition in a patient. Non-limiting examples of components useful for medical evaluation include: deoxyhemoglobin levels, oxyhemoglobin levels, total hemoglobin levels, oxygen saturation, oxygen perfusion, hydration levels, total hematocrit levels, melanin levels, collagen levels, and bilirubin levels. Likewise, the pattern, gradient, or change over time of a skin or blood component can be used to provide information on the medical condition of the patient.

Non-limiting examples of conditions that can be evaluated by hyperspectral/multispectral imaging, include: tissue ischemia, ulcer formation, ulcer progression, venous stasis, venous ulcer disease, infection, shock, cardiac decompensation, respiratory insufficiency, hypovolemia, the progression of diabetes, congestive heart failure, sepsis, dehydration, hemorrhage, hypertension, exposure to a chemical or biological agent, and an inflammatory response.

In one embodiment, the systems and methods described herein are used to evaluate tissue oximetry and correspondingly, medical conditions relating to patient health derived from oxygen measurements in the superficial vasculature. In certain embodiments, the systems and methods described herein allow for the measurement of oxygenated hemoglobin, deoxygenated hemoglobin, oxygen saturation, oxygen usage, and oxygen perfusion. Processing of these data provide information to assist a physician with, for example, diagnosis, prognosis, assignment of treatment, assignment of surgery, and the execution of surgery for conditions such as peripheral arterial disease (PAD), ulceration, gangrene, venous stasis, venous ulcer disease, infection, cardiac decompensation, respiratory insufficiency, hypovolemia, congestive heart failure, sepsis, dehydration, hypertension, critical limb ischemia, diabetic foot ulcers, pressure ulcers, peripheral vascular disease, surgical tissue health, etc.

In one embodiment, the systems and methods described herein are used to evaluate diabetic and pressure ulcers.

Development of a diabetic foot ulcer is commonly a result of a break in the barrier between the dermis of the skin and the subcutaneous fat that cushions the foot during ambulation. This rupture can lead to increased pressure on the dermis, resulting in tissue ischemia and eventual death, and ultimately manifesting in the form of an ulcer (Frykberg R. G. et al., Diabetes Care 1998; 21(10): 1714-9). Measurement of oxyhemoglobin, deoxyhemoglobin, and/or oxygen saturation levels by hyperspectral/multispectral imaging can provide medical information regarding, for example: a likelihood of ulcer formation at an ROI, diagnosis of an ulcer, identification of boundaries for an ulcer, progression or regression of ulcer formation, a prognosis for healing of an ulcer, the likelihood of amputation resulting from an ulcer. Further information on hyperspectral/multispectral methods for the detection and characterization of ulcers, e.g., diabetic foot ulcers, are found in U.S. Patent Application Publication No. 2007/0038042, and Nouvong A. et al., Diabetes Care. 2009 November; 32(11):2056-61, the contents of which are hereby incorporated herein by reference in their entireties for all purposes.

In one embodiment, the systems and methods described herein are used to evaluate shock in a subject. Clinical presentation of shock is variable from subject to subject. While common indicators for a state of shock include low blood pressure, decreased urine output, and confusion, these symptoms do not manifest in all subjects (Tintinalli J. E., "Emergency Medicine: A Comprehensive Study Guide," New York: McGraw-Hill Companies. pp. 165-172). However, it was found that changes in cutaneous oxygen saturation, an underlying cause of shock, present as pronounced hyperspectral mottling patterns in subjects experiencing hemorrhagic shock (U.S. Patent Application Publication No. 2007/0024946). Accordingly, measurement of oxyhemoglobin, deoxyhemoglobin, and/or oxygen saturation levels by hyperspectral/multispectral imaging can provide medical information regarding, for example: a likelihood of a subject entering a state of shock, diagnosis of a state of shock, progression or regression of a state of shock, and a prognosis for the recovery from a state of shock. In certain embodiments, the shock is hemorrhagic shock, hypovolemic shock, cardiogenic shock, septic shock, anaphylactic shock, or neurogenic shock. Methods for the detection and characterization of shock are found in U.S. Patent Application Publication No. 2007/0024946, the content of which is hereby incorporated herein by reference in its entirety for all purposes.

Further examples of medical conditions that may be diagnosed and/or characterized by the methods and systems of the present disclosure include, but are not limited to: abrasion, alopecia, atrophy, av malformation, battle sign, bullae, burrow, basal cell carcinoma, burn, candidal diaper dermatitis, cat-scratch disease, contact dermatitis, cutaneous larva migrans, cutis marmorata, dermatoma, ecchymosis, ephelides, erythema infectiosum, erythema multiforme, eschar, excoriation, fifth disease, folliculitis, graft vs. host disease, guttate, guttate psoriasis, hand, foot and mouth disease, Henoch-Schonlein purpura, herpes simplex, hives, id reaction, impetigo, insect bite, juvenile rheumatoid arthritis, Kawasaki disease, keloids, keratosis pilaris, Koebner phenomenon, Langerhans cell histiocytosis, leukemia, lichen striatus, lichenification, livedo reticularis, lymphangitis, measles, meningococcemia, molluscum contagiosum, neurofibromatosis, nevus, poison ivy dermatitis, psoriasis, scabies, scarlet fever, scar, seborrheic dermatitis, serum sickness, Shagreen plaque, Stevens-Johnson syndrome, strawberry tongue, swimmers' itch, telangiectasia, tinea capitis, tinea corporis, tuberous sclerosis, urticaria, varicella, varicella zoster, wheal, xanthoma, zosteriform, basal cell carcinoma, squamous cell carcinoma, malignant melanoma, dermatofibrosarcoma protuberans, Merkel cell carcinoma, and Kaposi's sarcoma.

Other examples of medical conditions include, but are not limited to: tissue viability (e.g., whether tissue is dead or living, and/or whether it is predicted to remain living); tissue ischemia; malignant cells or tissues (e.g., delineating malignant from benign tumors, dysplasias, precancerous tissue, metastasis); tissue infection and/or inflammation; and/or the presence of pathogens (e.g., bacterial or viral counts). Some embodiments include differentiating different types of tissue from each other, for example, differentiating bone from flesh, skin, and/or vasculature. Some embodiments exclude the characterization of vasculature.

In yet other embodiments, the systems and methods provided herein can be used during surgery, for example to determine surgical margins, evaluate the appropriateness of surgical margins before or after a resection, evaluate or monitor tissue viability in near-real time or real-time, or to assist in image-guided surgery. For more information on the use of hyperspectral/multispectral imaging during surgery, see, Holzer M. S. et al., J Urol. 2011 August; 186(2):400-4; Gibbs-Strauss S. L. et al., Mol Imaging. 2011 April; 10(2): 91-101; and Panasyuk S. V. et al., Cancer Biol Ther. 2007 March; 6(3):439-46, the contents of which are hereby incorporated herein by reference in their entirety for all purposes.

For more information on the use of hyperspectral/multispectral imaging in medical assessments, see, for example: Chin J. A. et al., J Vasc Surg. 2011 December; 54(6): 1679-88; Khaodhiar L. et al., Diabetes Care 2007; 30:903-910; Zuzak K. J. et al., Anal Chem. 2002 May 1; 74(9): 2021-8; Uhr J. W. et al., Transl Res. 2012 May; 159(5):366-75; Chin M. S. et al., J Biomed Opt. 2012 February; 17(2):026010; Liu Z. et al., Sensors (Basel). 2012; 12(1): 162-74; Zuzak K. J. et al., Anal Chem. 2011 Oct. 1; 83(19):7424-30; Palmer G. M. et al., J Biomed Opt. 2010 November-December; 15(6):066021; Jafari-Saraf and Gordon, Ann Vasc Surg. 2010 August; 24(6):741-6; Akbari H. et al., IEEE Trans Biomed Eng. 2010 August; 57(8):2011-7; Akbari H. et al., Conf Proc IEEE Eng Med Biol Soc. 2009:1461-4; Akbari H. et al., Conf Proc IEEE Eng Med Biol Soc. 2008:1238-41; Chang S. K. et al., Clin Cancer Res. 2008 Jul. 1; 14(13):4146-53; Siddiqi A. M. et al., Cancer. 2008 Feb. 25; 114(1):13-21; Liu Z. et al., Appl Opt. 2007 Dec. 1; 46(34):8328-34; Zhi L. et al., Comput Med Imaging Graph. 2007 December; 31(8):672-8; Khaodhiar L. et al., Diabetes Care. 2007 April; 30(4):903-10; Ferris D. G. et al., J Low Genit Tract Dis. 2001 April; 5(2):65-72; Greenman R. L. et al., Lancet. 2005 Nov. 12; 366(9498):1711-7; Sorg B. S. et al., J Biomed Opt. 2005 July-August; 10(4):44004; Gillies R. et al., and Diabetes Technol Ther. 2003; 5(5):847-55, the contents of which are hereby incorporated herein by reference in their entirety for all purposes.

Additional Embodiments. In one embodiment, the present disclosure provides a hyperspectral/multispectral imaging system for remote sensing. For example, the disclosed external device 200 and coupled attachment device 100 can be mounted within a satellite or other airborne device. The airborne device can then be used in, for example: geological surveying, e.g., in the mining and oil industries to search for oil seeps (Ellis J., "Searching for oil seeps and oil-impacted soil with hyperspectral imagery," Earth Observation Magazine, January 2001) or pockets of other mineral resources; agricultural surveying, e.g., monitoring of crops or identification of suitable soil; surveillance, e.g., in military reconnaissance; chemical imaging, e.g., for detecting harmful or toxic agents or chemical emissions; and environmental monitoring; e.g., monitoring levels of chemicals in the atmosphere and sub-atmospheric regions.

Additionally, the low maximum power requirements of the disclosed external device 200 and coupled attachment device 100 described herein make these devices well suited for other portable applications. For example, as a handheld device used on the battlefield to quickly determine the status of a wounded soldier or detect the presence of a chemical agent. For additional information on the use of hyperspectral/multispectral imaging for triage or other battlefield embodiments, see, U.S. Patent Publication No. 2007/0024946, the content of which is hereby incorporated by reference in its entirety for all purposes.

In another embodiment, the disclosed external device 200 and coupled attachment device 100, as described herein, can be used to detect harmful emissions, identify chemical spills, or otherwise identify unsafe working conditions, e.g., at a factory, refinery, or chemical plant. In certain embodiments, the disclosed external device 200 and coupled attachment device 100 may be affixed on a wall, ceiling, post, etc., at a plant or factory to continuously monitor conditions of the atmosphere for safe working conditions.

In another embodiment, the disclosed external device 200 and coupled attachment device 100, as described herein, can be used for forensic analysis. In some embodiments, the hyperspectral/multispectral methods and systems provided herein can be used, for example: to determine the time of death based on change in cellular chemistry analyzed by the imager; evaluate the proximity of a gunshot based on residue left on target; determine the severity of blunt trauma; determine whether oxygen deprivation occurred pre- or post-mortem; evaluate drug status; identify the location and composition of body fluids present at a crime scene; determine if an injury is old or new; make field assessments; locate evidence and provide in-situ evaluation (e.g., the identification of brass casings over a large area); determine the location of man-made objects; evaluate machined surfaces having varying polarization and spectral responses, analyze bodily fluids spread over a large area; identify a point of impact; evaluate an entire incident scene (as opposed to sampling of individual points within the scene), identify different hairs for DNA analysis; locate and separate out of hairs in a carpet; and analyze chemical residues present on a surface or subject (e.g., gun powder). For additional information on the use of hyperspectral/multispectral imaging in forensics, see U.S. Pat. No. 6,640,132 to Freeman and Hopmeier, the content of which is hereby incorporated herein by reference in its entirety for all purposes.

Aspects of the disclosed methodologies can be implemented as a computer program product that includes a computer program mechanism embedded in a non-transitory computer-readable storage medium. Further, any of the methods disclosed herein can be implemented in one or more computers or other forms of apparatus. Further still, any of the methods disclosed herein can be implemented in one or more computer program products. Some embodiments disclosed herein provide a computer program product that encodes any or all of the methods disclosed herein. Such methods can be stored on a CD-ROM, DVD, magnetic disk storage product, or any other non-transitory computer-readable data or program storage product. Such methods can also be embedded in permanent storage, such as ROM, one or more programmable chips, or one or more application specific integrated circuits (ASICs). Such permanent storage can be localized in a server, 802.11 access point, 802.11 wireless bridge/station, repeater, router, handheld mobile device, laptop computer, desktop computer, or other electronic devices.

Some embodiments provide a computer program product that contains any or all of the program modules shown FIG. 5. These program modules can be stored on a CD-ROM, DVD, magnetic disk storage product, or any other computer-readable data or program storage product. The program modules can also be embedded in permanent storage, such as ROM, one or more programmable chips, or one or more application specific integrated circuits (ASICs). Such permanent storage can be localized in a server, 802.11 access point, 802.11 wireless bridge/station, repeater, router, mobile phone, or other electronic devices.

Hyperspectral Medical Imaging. Various implementations of the present disclosure provide for systems and methods useful for hyperspectral/multispectral medical imaging (HSMI). HSMI relies upon distinguishing the interactions that occur between light at different wavelengths and components of the human body, especially components located in or just under the skin. For example, it is well known that deoxyhemoglobin absorbs a greater amount of light at 700 nm than does water, while water absorbs a much greater amount of light at 1200 nm, as compared to deoxyhemoglobin. By measuring the absorbance of a two-component system consisting of deoxyhemoglobin and water at 700 nm and 1200 nm, the individual contribution of deoxyhemoglobin and water to the absorption of the system, and thus the concentrations of both components, can readily be determined. By extension, the individual components of more complex systems (e.g., human skin) can be determined by measuring the absorption of a plurality of wavelengths of light reflected or backscattered off of the system.

The particular interactions between the various wavelengths of light measured by hyperspectral/multispectral imaging and each individual component of the system (e.g., skin) produces hyperspectral/multispectral signature, when the data is constructed into a hyperspectral/multispectral data cube. Specifically, different regions (e.g., different regions of interest or ROI on a single subject or different ROIs from different subjects) interact differently with light depending on the presence of, e.g., a medical condition in the region, the physiological structure of the region, and/or the presence of a chemical in the region. For example, fat, skin, blood, and flesh all interact with various wavelengths of light differently from one another. A given type of cancerous lesion interacts with various wavelengths of light differently from normal skin, from non-cancerous lesions, and from other types of cancerous lesions. Likewise, a given chemical that is present (e.g., in the blood, or on the skin) interacts with various wavelengths of light differently from other types of chemicals. Thus, the light obtained from each illuminated region of a subject has a spectral signature based on the characteristics of the region, which signature contains medical information about that region.

The structure of skin, while complex, can be approximated as two separate and structurally different layers, namely the epidermis and dermis. These two layers have very different scattering and absorption properties due to differences of composition. The epidermis is the outer layer of skin. It has specialized cells called melanocytes that produce melanin pigments. Light is primarily absorbed in the epidermis, while scattering in the epidermis is considered negligible. For further details, see G. H. Findlay, "Blue Skin," British Journal of Dermatology 83(1), 127-134

(1970), the content of which is incorporated herein by reference in its entirety for all purposes.

The dermis has a dense collection of collagen fibers and blood vessels, and its optical properties are very different from that of the epidermis. Absorption of light of a bloodless dermis is negligible. However, blood-born pigments like oxy- and deoxy-hemoglobin and water are major absorbers of light in the dermis. Scattering by the collagen fibers and absorption due to chromophores in the dermis determine the depth of penetration of light through skin.

Light used to illuminate the surface of a subject will penetrate into the skin. The extent to which the light penetrates will depend upon the wavelength of the particular radiation. For example, with respect to visible light, the longer the wavelength, the farther the light will penetrate into the skin. For example, only about 32% of 400 nm violet light penetrates into the dermis of human skin, while greater than 85% of 700 nm red light penetrates into the dermis or beyond (see, Capinera J. L., "Photodynamic Action in Pest Control and Medicine", Encyclopedia of Entomology, 2nd Edition, Springer Science, 2008, pp. 2850-2862, the content of which is hereby incorporated herein by reference in its entirety for all purposes). For purposes of the present disclosure, when referring to "illuminating a tissue," "reflecting light off of the surface," and the like, it is meant that radiation of a suitable wavelength for detection is backscattered from a tissue of a subject, regardless of the distance into the subject the light travels. For example, certain wavelengths of infra-red radiation penetrate below the surface of the skin, thus illuminating the tissue below the surface of the subject.

Briefly, light from the illuminator(s) on the systems described herein penetrates the subject's superficial tissue and photons scatter in the tissue, bouncing inside the tissue many times. Some photons are absorbed by oxygenated hemoglobin molecules at a known profile across the spectrum of light. Likewise for photons absorbed by de-oxygenated hemoglobin molecules. The images resolved by the optical detectors consist of the photons of light that scatter back through the skin to the lens subsystem. In this fashion, the images represent the light that is not absorbed by the various chromophores in the tissue or lost to scattering within the tissue. In some embodiments, light from the illuminators that does not penetrate the surface of the tissue is eliminated by use of polarizers. Likewise, some photons bounce off the surface of the skin into air, like sunlight reflecting off a lake.

Accordingly, different wavelengths of light may be used to examine different depths of a subject's skin tissue. Generally, high frequency, short-wavelength visible light is useful for investigating elements present in the epidermis, while lower frequency, long-wavelength visible light is useful for investigating both the epidermis and dermis. Furthermore, certain infra-red wavelengths are useful for investigating the epidermis, dermis, and subcutaneous tissues.

In the visible and near-infrared (VNIR) spectral range and at low intensity irradiance, and when thermal effects are negligible, major light-tissue interactions include reflection, refraction, scattering and absorption. For normal collimated incident radiation, the regular reflection of the skin at the air-tissue interface is typically only around 4%-7% in the 250-3000 nanometer (nm) wavelength range. For further details, see Anderson, R. R. et al., "The Optics of Human Skin", Journal of Investigative Dermatology, 77, pp. 13-19, 1981, the content of which is hereby incorporated by reference in its entirety for all purposes. When neglecting the air-tissue interface reflection and assuming total diffusion of incident light after the stratum corneum layer, the steady state VNIR skin reflectance can be modeled as the light that first survives the absorption of the epidermis, then reflects back toward the epidermis layer due the isotropic scattering in the dermis layer, and then finally emerges out of the skin after going through the epidermis layer again.

Accordingly, the systems and methods described herein can be used to diagnose and characterize a wide variety of medical conditions. In one embodiment, the concentration of one or more skin or blood component is determined in order to evaluate a medical condition in a patient. Non-limiting examples of components useful for medical evaluation include: deoxyhemoglobin levels, oxyhemoglobin levels, total hemoglobin levels, oxygen saturation, oxygen perfusion, hydration levels, total hematocrit levels, melanin levels, collagen levels, and bilirubin levels. Likewise, the pattern, gradient, or change over time of a skin or blood component can be used to provide information on the medical condition of the patient.

Non-limiting examples of conditions that can be evaluated by hyperspectral/multispectral imaging include: tissue ischemia, ulcer formation, ulcer progression, pressure ulcer formation, pressure ulcer progression, diabetic foot ulcer formation, diabetic foot ulcer progression, venous stasis, venous ulcer disease, peripheral artery disease, atherosclerosis, infection, shock, cardiac decompensation, respiratory insufficiency, hypovolemia, the progression of diabetes, congestive heart failure, sepsis, dehydration, hemorrhage, hemorrhagic shock, hypertension, cancer (e.g., detection, diagnosis, or typing of tumors or skin lesions), retinal abnormalities (e.g., diabetic retinopathy, macular degeneration, or corneal dystrophy), skin wounds, burn wounds, exposure to a chemical or biological agent, and an inflammatory response.

In various embodiments, the systems and methods described herein are used to evaluate tissue oximetery and correspondingly, medical conditions relating to patient health derived from oxygen measurements in the superficial vasculature. In certain embodiments, the systems and methods described herein allow for the measurement of oxygenated hemoglobin, deoxygenated hemoglobin, oxygen saturation, and oxygen perfusion. Processing of these data provide information to assist a physician with, for example, diagnosis, prognosis, assignment of treatment, assignment of surgery, and the execution of surgery for conditions such as critical limb ischemia, diabetic foot ulcers, pressure ulcers, peripheral vascular disease, surgical tissue health, etc.

In various embodiments, the systems and methods described herein are used to evaluate diabetic and pressure ulcers. Development of a diabetic foot ulcer is commonly a result of a break in the barrier between the dermis of the skin and the subcutaneous fat that cushions the foot during ambulation. This rupture can lead to increased pressure on the dermis, resulting in tissue ischemia and eventual death, and ultimately manifesting in the form of an ulcer (Frykberg R. G. et al., "Role of neuropathy and high foot pressures in diabetic foot ulceration", Diabetes Care, 21(10), 1998:1714-1719). Measurement of oxyhemoglobin, deoxyhemoglobin, and/or oxygen saturation levels by hyperspectral/multispectral imaging can provide medical information regarding, for example: a likelihood of ulcer formation at an ROI, diagnosis of an ulcer, identification of boundaries for an ulcer, progression or regression of ulcer formation, a prognosis for healing of an ulcer, the likelihood of amputation resulting from an ulcer. Further information on hyperspectral/multispectral methods for the detection and characterization of ulcers, e.g., diabetic foot ulcers, are found in U.S. Patent Application Publication No. 2007/0038042, and Nouvong, A. et al., "Evaluation of diabetic foot ulcer healing with hyperspectral imaging of oxyhemoglobin and deoxyhemoglobin", Diabetes Care. 2009 November; 32(11):2056-2061, the contents of which are hereby incorporated herein by reference in their entireties for all purposes.

Other examples of medical conditions include, but are not limited to: tissue viability (e.g., whether tissue is dead or living, and/or whether it is predicted to remain living); tissue ischemia; malignant cells or tissues (e.g., delineating malignant from benign tumors, dysplasias, precancerous tissue, metastasis); tissue infection and/or inflammation; and/or the presence of pathogens (e.g., bacterial or viral counts). Various embodiments may include differentiating different types of tissue from each other, for example, differentiating bone from flesh, skin, and/or vasculature. Various embodiments may exclude the characterization of vasculature.

In various embodiments, the systems and methods provided herein can be used during surgery, for example to determine surgical margins, evaluate the appropriateness of surgical margins before or after a resection, evaluate or monitor tissue viability in near-real time or real-time, or to assist in image-guided surgery. For more information on the use of hyperspectral/multispectral imaging during surgery, see, Holzer M. S. et al., "Assessment of renal oxygenation during partial nephrectomy using hyperspectral imaging", J Urol. 2011 August; 186(2):400-4; Gibbs-Strauss S. L. et al., "Nerve-highlighting fluorescent contrast agents for image-guided surgery", Mol Imaging. 2011 April; 10(2):91-101; and Panasyuk S. V. et al., "Medical hyperspectral imaging to facilitate residual tumor identification during surgery", Cancer Biol Ther. 2007 March; 6(3):439-46, the contents of which are hereby incorporated herein by reference in their entirety for all purposes.

For more information on the use of hyperspectral/multispectral imaging in medical assessments, see, for example: Chin J. A. et al., J Vasc Surg. 2011 December; 54(6):1679-88; Khaodhiar L. et al., Diabetes Care 2007; 30:903-910; Zuzak K. J. et al., Anal Chem. 2002 May 1; 74(9):2021-8; Uhr J. W. et al., Transl Res. 2012 May; 159(5):366-75; Chin M. S. et al., J Biomed Opt. 2012 February; 17(2):026010; Liu Z. et al., Sensors (Basel). 2012; 12(1):162-74; Zuzak K. J. et al., Anal Chem. 2011 Oct. 1; 83(19):7424-30; Palmer G. M. et al., J Biomed Opt. 2010 November-December; 15(6): 066021; Jafari-Saraf and Gordon, Ann Vasc Surg. 2010 August; 24(6):741-6; Akbari H. et al., IEEE Trans Biomed Eng. 2010 August; 57(8):2011-7; Akbari H. et al., ConfProc IEEE Eng Med Biol Soc. 2009:1461-4; Akbari H. et al., Conf Proc IEEE Eng Med Biol Soc. 2008:1238-41; Chang S. K. et al., Clin Cancer Res. 2008 Jul. 1; 14(13):4146-53; Siddiqi A. M. et al., Cancer. 2008 Feb. 25; 114(1): 13-21; Liu Z. et al., Appl Opt. 2007 Dec. 1; 46(34):8328-34; Zhi L. et al., Comput Med Imaging Graph. 2007 December; 31(8): 672-8; Khaodhiar L. et al., Diabetes Care. 2007 April; 30(4):903-10; Ferris D. G. et al., J Low Genit Tract Dis. 2001 April; 5(2):65-72; Greenman R. L. et al., Lancet. 2005 Nov. 12; 366(9498): 1711-7; Sorg B. S. et al., J Biomed Opt. 2005 July-August; 10(4):44004; Gillies R. et al., and Diabetes Technol Ther. 2003; 5(5):847-55, the contents of which are hereby incorporated herein by reference in their entirety for all purposes.

References. All references cited herein are hereby incorporated by reference herein in their entirety and for all purposes to the same extent as if each individual publication or patent or patent application was specifically and individually indicated to be incorporated by reference in its entirety for all purposes.

Many modifications and variations of this application can be made without departing from its spirit and scope, as will be apparent to those skilled in the art. The specific embodiments described herein are offered by way of example only, and the application is to be limited only by the terms of the appended claims, along with the full scope of equivalents to which the claims are entitled.

What is claimed is:

1. An attachment device, comprising:
a cover having a first optical window and a second optical window;
a backing, having a third optical window and a fourth optical window, wherein,
the cover is affixed onto the backing thereby forming a casing having an interior,
the first and third optical windows form a first optical path within the casing interior, in which light entering the third optical window passes through the first optical window, and
the second and fourth optical windows form a second optical path within the casing interior, in which light entering the second optical window passes through the fourth optical window;
a filter housing in the interior of the casing, the filter housing comprising a plurality of filters, each filter in the plurality of filters characterized by a wavelength range in a plurality of wavelength ranges, wherein the filter housing is moveable along or about an axis to thereby selectively intercept the first optical path, wherein
a first filter in the plurality of filters is characterized by a first wavelength range in the plurality of wavelength ranges, wherein the first filter is transparent to the first wavelength range and opaque to other wavelengths in at least the visible spectrum,
a second filter in the plurality of filters is characterized by a second wavelength range in the plurality of wavelength ranges, wherein the second filter is transparent to the second wavelength range and opaque to other wavelengths in at least the visible spectrum, and
the first wavelength range is other than the second wavelength range;
a motor in the interior of the casing, wherein the motor is configured to move the filter housing;
a circuit board in the interior of the casing, wherein the circuit board comprises non-transistory instructions for implementing at least a portion of a hyperspectral/multispectral imaging regimen, wherein the instructions for implementing the hyperspectral/multispectral imaging regimen include instructions for driving the motor in accordance with the hyperspectral/multispectral imaging regimen;
a communications interface configured to send instructions to an external device, comprising a two-dimensional imager and a light source, to control the two-dimensional imager and the light source in accordance with the hyperspectral/multispectral imaging regimen, wherein the attachment device is attached to the external device; and
a source of power, in the interior of the casing powers the circuit board, the motor, and the communications interface.

2. The attachment device of claim 1, wherein the second optical window or the fourth optical window comprises a first light source polarizer that polarizes light in the second optical path.

3. The attachment device of claim 1, wherein the second optical window or the fourth optical window comprises a first homogenizer that homogenizes light in the second optical path.

4. The attachment device of claim 1, wherein the two-dimensional imager is selected from the group consisting of a charge-coupled device (CCD), a complementary metal-oxide-semiconductor (CMOS), a photo-cell, and a focal plane array.

5. The attachment device of claim 1, wherein the plurality of filters comprises at least one bandpass filter.

6. The attachment device of claim 1, wherein the plurality of filters comprises at least one longpass filter.

7. The attachment device of claim 1, wherein the plurality of filters comprises at least one shortpass filter.

8. The attachment device of claim 1, wherein the hyperspectral/multispectral imaging regimen comprises instructions for:
   a) driving the filter housing to a first position in which the first filter selectively intercepts the first optical path,
   b) communicating instructions, via the communications interface, to the light source to power on;
   c) communicating instructions, via the communications interface, to the two-dimensional imager to acquire a first image of light passing through the first optical path when the filter housing is in the first position;
   d) driving, after the first image is acquired, the filter housing to a second position in which the second filter selectively intercepts the first optical path and the first filter no longer intercepts the first optical path; and
   e) communicating instructions, via the communications interface, to the two-dimensional imager to acquire a second image of light passing through the first optical path when the filter housing is in the second position.

9. The attachment device of claim 1, wherein the communication interface comprises a wireless signal transmission element and instructions are sent in accordance with the hyperspectral/multispectral imaging regimen to the external light source by the wireless signal transmission element.

10. The attachment device of claim 9, wherein the wireless signal transmission element is selected from the group consisting of a bluetooth transmission element, a ZigBee transmission element, and a Wi-Fi transmission element.

11. The attachment device of claim 1, wherein the communication interface comprises a first communications interface and instructions are sent in accordance with the hyperspectral/multispectral imaging regimen to the external light by a cable coupled to the first communications interface source and a second communications interface of the external device.

12. The attachment device of claim 1, wherein the communications interface comprises a first communications interface and wherein the housing attaches to the external device thereby bringing the first communications interface in direct physical and electrical communication with a second communications interface of the external device thereby enabling instructions to be sent directly to the second communications interface from the first communications interface in accordance with the hyperspectral/multispectral imaging regimen.

13. The attachment device of claim 1, wherein the external device is selected from the group consisting of a smart phone, a personal digital assistant (PDA), an enterprise digital assistant, a tablet computer, and a digital camera.

14. The attachment device of claim 1, wherein
   the external device further comprises a display, and
   the hyperspectral/multispectral imaging regimen further comprises instructions for displaying an image captured by the two-dimensional imager, in accordance with the hyperspectral/multispectral imaging regimen, on the housing display.

15. The attachment device of claim 14, wherein the housing display is a touch screen display and wherein the displayed image is configured to be enlarged or reduced by human touch to the touch screen display.

16. The attachment device of 14, wherein the housing display is used for focusing an image of a surface of a subject acquired by the two-dimensional imager.

17. The attachment device of claim 1, wherein the attachment device has a maximum power consumption of less than 15 watts.

18. The attachment device of claim 1, wherein the attachment device has a maximum power consumption of less than 10 watts.

19. The attachment device of claim 1, wherein the attachment device has a maximum power consumption of less than 5 watts.

20. The attachment device of claim 1, wherein the source of power is a battery.

* * * * *